(12) United States Patent
Wierse et al.

(10) Patent No.: US 10,173,541 B2
(45) Date of Patent: Jan. 8, 2019

(54) METHOD OF COMMUNICATION BETWEEN A VEHICLE AND A WAYSIDE CONTROL UNIT FOR CONTROLLING AN INDUCTIVE ENERGY TRANSFER TO THE VEHICLE, A VEHICLE, A WAYSIDE CONTROL UNIT AND AN ARRANGEMENT OF A VEHICLE AND A WAYSIDE CONTROL UNIT

(71) Applicant: Bombardier Primove GmbH, Berlin (DE)

(72) Inventors: Ralf Wierse, Pattensen (DE); Tobias Quintern, Hannover (DE); Thoralf Schnarr, Bissersheim (DE)

(73) Assignee: Bombardier Primove GmbH, Berlin (DE)

( * ) Notice: Subject to any disclaimer, the term of this patent is extended or adjusted under 35 U.S.C. 154(b) by 166 days.

(21) Appl. No.: 15/116,972

(22) PCT Filed: Feb. 4, 2015

(86) PCT No.: PCT/EP2015/052253
§ 371 (c)(1),
(2) Date: Aug. 5, 2016

(87) PCT Pub. No.: WO2015/117989
PCT Pub. Date: Aug. 13, 2015

(65) Prior Publication Data
US 2016/0347187 A1 Dec. 1, 2016

(30) Foreign Application Priority Data
Feb. 5, 2014 (GB) .................................. 1401960.8

(51) Int. Cl.
*B60L 11/18* (2006.01)
*H02J 50/90* (2016.01)
(Continued)

(52) U.S. Cl.
CPC ......... *B60L 11/182* (2013.01); *B60L 11/1824* (2013.01); *B60L 11/1831* (2013.01);
(Continued)

(58) Field of Classification Search
CPC .............. B60L 11/1827; B60L 11/1829; B60L 11/1831; B60L 11/1833; B60L 11/1835; H02J 50/90; Y02T 90/125
See application file for complete search history.

(56) References Cited

U.S. PATENT DOCUMENTS

| 7,243,752 B2* | 7/2007 | Green ..................... B60L 5/005 |
| | | 180/168 |
| 7,454,170 B2 | 11/2008 | Goossens et al. |

(Continued)

FOREIGN PATENT DOCUMENTS

| CN | 1864343 A | 11/2006 |
| CN | 102106054 A | 6/2011 |

(Continued)

Primary Examiner — Kenneth B Wells
(74) Attorney, Agent, or Firm — The Webb Law Firm

(57) ABSTRACT

A method of detecting a correct position and/or orientation of a secondary winding structure of a secondary unit relative to a primary winding structure of a primary unit of a system for inductive power transfer to a vehicle, wherein the vehicle includes the secondary unit for receiving an alternating electromagnetic field which is generated by the primary unit, wherein the vehicle includes at least a first transmitter for transmitting a first signal and a second transmitter for transmitting a second signal, wherein a wayside control unit includes at least one receiving means for receiving the first and the second signal, and wherein the correct position and/or orientation of the secondary winding structure of the secondary unit relative to the primary winding structure of the primary unit is detected depending on the first and the second signal.

20 Claims, 11 Drawing Sheets

(51) Int. Cl.

| | | |
|---|---|---|
| *B61L 3/12* | (2006.01) | |
| *B61L 15/00* | (2006.01) | |
| *G08C 17/04* | (2006.01) | |
| *H02J 7/02* | (2016.01) | |
| *B61L 25/02* | (2006.01) | |
| *H02J 5/00* | (2016.01) | |
| *H04B 5/00* | (2006.01) | |
| *G05D 1/02* | (2006.01) | |
| *G01V 3/06* | (2006.01) | |
| *H02J 50/10* | (2016.01) | |
| *G07C 5/00* | (2006.01) | |
| *B61L 3/22* | (2006.01) | |
| *B61L 3/24* | (2006.01) | |
| *H02J 7/00* | (2006.01) | |

(52) U.S. Cl.
CPC ........... *B60L 11/1846* (2013.01); *B61L 3/121* (2013.01); *B61L 3/126* (2013.01); *B61L 15/0027* (2013.01); *B61L 25/025* (2013.01); *B61L 25/028* (2013.01); *G01V 3/06* (2013.01); *G05D 1/0225* (2013.01); *G07C 5/008* (2013.01); *G08C 17/04* (2013.01); *H02J 5/005* (2013.01); *H02J 7/025* (2013.01); *H02J 7/027* (2013.01); *H02J 50/10* (2016.02); *H02J 50/90* (2016.02); *H04B 5/0031* (2013.01); *H04B 5/0037* (2013.01); *H04B 5/0075* (2013.01); *B60L 2200/26* (2013.01); *B61L 3/227* (2013.01); *B61L 3/24* (2013.01); *G05D 2201/0213* (2013.01); *H02J 2007/0001* (2013.01); *Y02T 10/7005* (2013.01); *Y02T 10/7072* (2013.01); *Y02T 90/121* (2013.01); *Y02T 90/122* (2013.01); *Y02T 90/125* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(56) References Cited

U.S. PATENT DOCUMENTS

| | | | | |
|---|---|---|---|---|
| 8,513,915 | B2* | 8/2013 | Patel | B60L 11/182 |
| | | | | 320/108 |
| 9,024,578 | B2* | 5/2015 | Fisher | H02J 7/0052 |
| | | | | 320/108 |
| 9,114,720 | B2* | 8/2015 | Oman | B60L 11/1829 |
| 9,722,447 | B2* | 8/2017 | Partovi | H02J 5/005 |
| 2006/0252370 | A1 | 11/2006 | Goossens et al. | |
| 2012/0001593 | A1 | 1/2012 | Di Guardo | |
| 2012/0091959 | A1 | 4/2012 | Martin et al. | |
| 2012/0098483 | A1 | 4/2012 | Patel | |
| 2012/0161530 | A1 | 6/2012 | Urano | |
| 2013/0029595 | A1 | 1/2013 | Widmer et al. | |
| 2013/0033224 | A1* | 2/2013 | Raedy | H02J 7/025 |
| | | | | 320/107 |
| 2013/0049484 | A1 | 2/2013 | Weissentem et al. | |
| 2013/0336367 | A1 | 12/2013 | Soderi et al. | |
| 2014/0145514 | A1 | 5/2014 | Konno et al. | |
| 2016/0264010 | A1 | 9/2016 | Boyer et al. | |
| 2016/0276878 | A1 | 9/2016 | Azancot et al. | |

FOREIGN PATENT DOCUMENTS

| | | | |
|---|---|---|---|
| CN | 102882245 | A | 1/2013 |
| CN | 103109333 | A | 5/2013 |
| JP | 20139545 | A | 1/2013 |
| WO | 2010040962 | A1 | 4/2010 |
| WO | 2012096169 | A1 | 7/2012 |
| WO | 2012164973 | A1 | 12/2012 |
| WO | 2013022207 | A1 | 2/2013 |

* cited by examiner

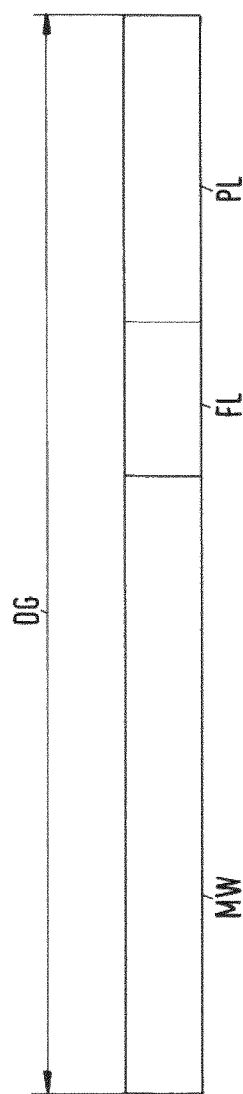

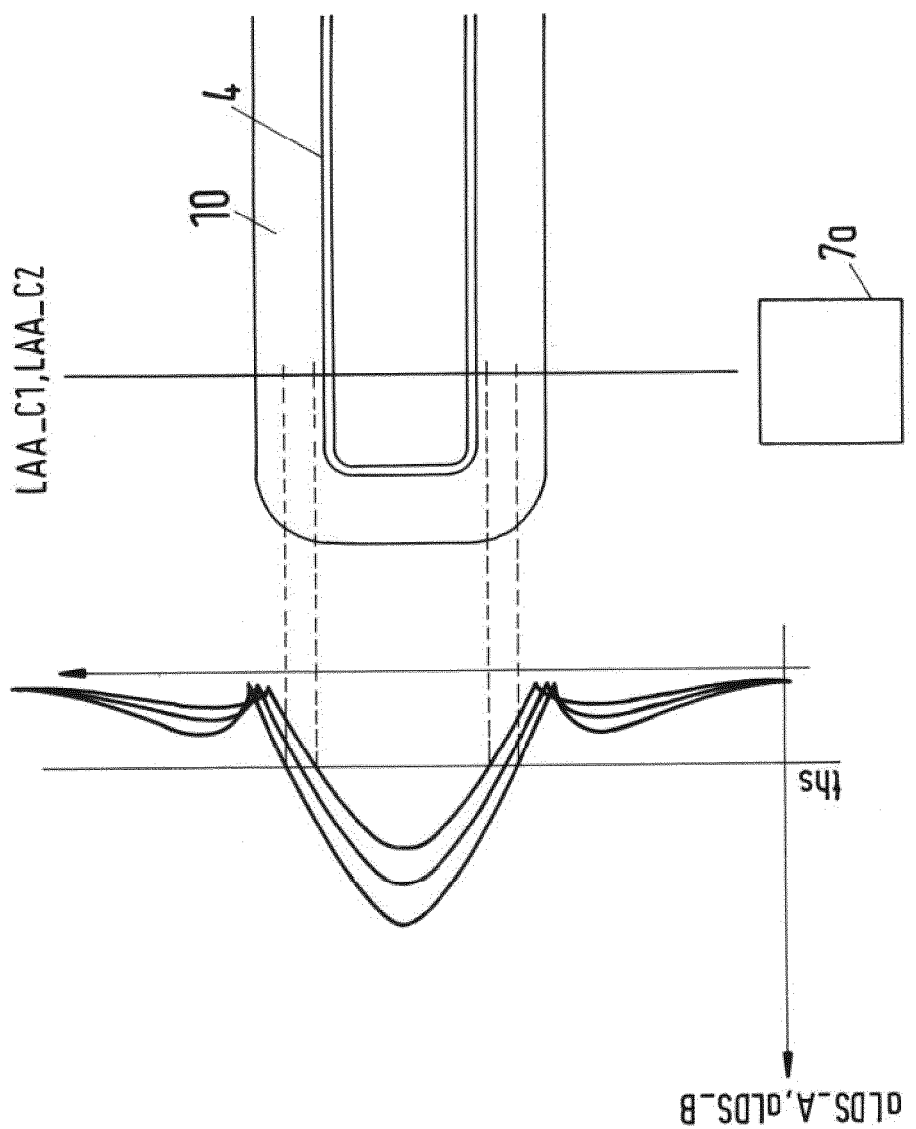

METHOD OF COMMUNICATION BETWEEN A VEHICLE AND A WAYSIDE CONTROL UNIT FOR CONTROLLING AN INDUCTIVE ENERGY TRANSFER TO THE VEHICLE, A VEHICLE, A WAYSIDE CONTROL UNIT AND AN ARRANGEMENT OF A VEHICLE AND A WAYSIDE CONTROL UNIT

CROSS-REFERENCE TO RELATED APPLICATIONS

This application is the United States national phase of International Application No. PCT/EP2015/052253 filed Feb. 4, 2015, and claims priority to United Kingdom Patent Application No. 1401960.8 filed Feb. 5, 2014, the disclosures of which are hereby incorporated in their entirety by reference.

BACKGROUND OF THE INVENTION

Field of the Invention

A method of communication between a vehicle and a wayside control unit for controlling an inductive energy transfer to the vehicle, a vehicle, a wayside control unit and an arrangement of a vehicle and a wayside control unit

Description of Related Art

The invention relates to a method of communication between a vehicle and a wayside control unit for controlling an inductive power transfer to the vehicle. Further, the invention relates to a vehicle, a wayside control unit, and an arrangement of the vehicle and the wayside control unit.

Electric vehicles, in particular a track-bound vehicle, and/or a road automobile, can be operated by electric energy which is transferred by means of an inductive power transfer. Such a vehicle may comprise a so-called receiving device adapted to receive an alternating electromagnetic field and to produce an alternating electric current by electromagnetic induction. Such a receiving device can comprise or provide a so-called secondary winding structure. Furthermore, such a vehicle can comprise a rectifier adapted to convert an alternating current (AC) to a direct current (DC). The DC can be used to charge a traction battery or to operate an electric machine. The rectifier converts the AC provided by the receiving device into the DC.

The inductive power transfer is usually performed using a primary unit which generates the alternating electromagnetic field by a primary winding structure and a secondary unit which comprises the receiving device for receiving said electromagnetic field. The primary unit and the secondary unit can e.g. each comprise a set of three-phase windings providing the aforementioned primary and secondary winding structure. A set of windings of the primary unit can be installed on the ground (primary windings) and can be fed by a wayside power converter (WPC). A set of windings of the secondary unit is installed on the vehicle. For example, the second set of windings can be attached underneath the vehicle, in the case of trams under some of its wagons. The set of windings of the primary unit can also be referred to as primary side, wherein the set of windings of the secondary unit can be referred to as secondary side. The first and the secondary side can be part of a high frequency transformer to transfer electric energy to the vehicle. This transfer can be done in a static state (when there is no movement of the vehicle) and in a dynamic state (when the vehicle moves).

U.S. Pat. No. 7,454,170 B2 discloses an inductive transmission system for inductive transmission of power and full duplex data signals between first and second devices. The transmission system includes a bi-directional inductive channel between the two devices, a transmitter for transmitting a power signal at a first frequency from the first device to the second device over the inductive channel, a first modulating device for modulating a first data signal at a first modulation frequency, and a second modulating device for modulating a second data signal at a second modulation frequency. Further, the transmitters transmit the modulated first data signals from the first device to the second device over the inductive channel and transmit the modulated second data signals from the second device to the first device over the inductive channel. The first modulation frequency and the second modulation frequency are at least a factor two apart.

Inductive power transfer usually requires a correct positioning of a vehicle-sided secondary winding structure relative to a primary winding structure in order to maximize the amount of transfer power but also in order to meet safety requirements and ensure an electromagnetic compatibility.

It is an object of the present invention to provide a method of detecting a correct position and/or orientation of a secondary winding structure of a secondary unit relative to a primary winding structure of a primary unit of a system for inductive power transfer to a vehicle, a vehicle, a wayside control unit and an arrangement of the vehicle and the wayside control unit which allow a reliable and fast detection of correct position and/or orientation.

It is a main idea of the invention to use at least two independent signals transmitted by at least two independent transmitters arranged at the vehicle and to evaluate said signals in order to determine a correct relative position and/or orientation between the secondary and the primary winding structure.

SUMMARY OF THE INVENTION

A method for detecting a correct position and/or orientation of a secondary winding structure of a secondary unit relative to a primary winding structure of a primary unit of a system for inductive power transfer to a vehicle is proposed.

The vehicle comprises the secondary unit for receiving an alternating electromagnetic field which is generated by the primary unit. In particular, the alternating electromagnetic field can be generated by the primary winding structure and received by the secondary winding structure.

The vehicle comprises at least a first transmitter for transmitting a first signal and a second transmitter for transmitting a second signal. This means that the vehicle comprises at least two transmitters. It is, of course, possible that the vehicle comprises more than two transmitters, wherein at least two, preferably all, transmitters of the set of transmitters can transmit signals independent of each other.

The first and the second transmitter can be arranged at different positions and, if applicable, with different orientations relative to the secondary winding structure. In particular, the first and the second transmitter are designed independent from each other, e.g. as separate units. The relative position and/or orientation of the transmitters and the secondary winding structure can be a predetermined position and/or orientation. Said position and/or orientation can e.g. be expressed in a vehicle-sided coordinate system. Thus, the first and the second signals are transmitted from different transmission points with respect to the secondary winding structure.

A wayside control unit comprises at least one receiving means for receiving the first and the second signal. The wayside control unit can control or at least enable the inductive power transfer to the vehicle. In particular, the wayside control unit can control characteristics of the voltage and/or current applied to the primary winding structure for generating the alternating electromagnetic field, in particular a frequency, an amplitude and/or another characteristics.

In the context of this invention, the feature that the wayside control unit comprises the receiving means denotes the fact that the at least one receiving means is assigned to the wayside control unit. This means that the received signal is transferred or transmitted from the at least one receiving means to the wayside control unit, e.g. for a subsequent signal analysis. The wayside control unit can comprise more than one receiving means, e.g. a first receiving means for receiving the first signal and a second receiving means for receiving the second signal. In particular, the number of receiving means can be equal to the number of transmitters. Alternatively, the wayside control unit can comprise only one receiving means for receiving at least two or more independent signals, in particular the first and the second signal.

The receiving means can e.g. be designed as an antenna. The at least one receiving means can be arranged at a predetermined position and/or with a predetermined orientation relative to the primary winding structure. This relative position and/or orientation can e.g. be expressed in a primary-sided coordinate system.

Further, the correct position and/or orientation of the secondary winding structure of the secondary unit relative to the primary winding structure of the primary unit is detected depending on at least the first and the second signal. The detection of the correct position and/or orientation can be performed depending on at least one predetermined signal characteristic and/or depending on data which is encoded in the received signal. Thus, a signal-based and/or data-based detection is proposed.

In other words, the first and the second signal can establish a communication link, wherein signals transmitted via the communication link are used to detect the correct relative position and/or orientation. It is, for instance, possible, that the at least one receiving means is designed and/or arranged with respect to the primary winding structure and with respect to the first and the second transmitter such that a correct (or an incorrect) position and/or orientation of the secondary winding structure relative to the primary winding structure can be unambiguously determined depending at least on the first and the second signal.

The relative arrangement of the first and the second transmitter and the at least one receiving means can e.g. be realized such that only in a relative position within a predetermined position interval and/or with a relative orientation within a predetermined orientation interval, both, the first and the second signal, are received by the at least one receiving means. If both signals are received, a correct position and/or orientation can be detected. If at least one of the signals is not received, an incorrect position and/or orientation can be detected. The relative position and/or orientation of the secondary winding structure and the primary winding structure can e.g. be expressed within a vehicle-sided coordinate system or a primary-sided coordinate system.

The vehicle-sided transmitters and/or the one or more receiving means can be arranged such that a correct position and/or orientation is detectable depending on at least two, or preferably all, independent signals transmitted to the at least one receiving means. This provides a large number of possible arrangements of the vehicle-sided transmitters with respect to the vehicle-sided coordinate system and/or of the one or more receiving means with respect to the primary-sided coordinate system.

The proposed method advantageously allows using signals transmitted by the vehicle not only for communication purposes but also for detecting a correct position and/or orientation. This, in turn, can be used to enable or disable an inductive power transfer. Thus, a functional safety of the inductive power transfer is enhanced.

The first and the second signal can also be used to establish a communication, preferably a unidirectional communication, between the vehicle and the wayside control unit. Thus, the communication via the first and the second signal is directed from the vehicle to the control unit.

Preferably, communication via the aforementioned communication link is a short distance communication. A short distance communication denotes communication, wherein data can only be reliably transmitted if a distance between a transmitter and a receiver is smaller than a predetermined distance, e.g. smaller than 0.5 m, 0.4 m or even 0.3 m. A reliable data transmission is e.g. given if a ratio between a transmission power and a receiving power is higher than a predetermined threshold value, e.g. higher than 700 mV.

Furthermore, the communication link can be established by radio link. This means that radio waves by which data is transmitted via the communication link are bundled with respect to one or multiple direction(s). Preferably, the radio waves are bundled and directed in a single main direction. In this case, the first and the second transmitter can be designed as directional antennas. Preferably, the main transmission direction of the first and the second transmitter is directed from the vehicle towards a route surface. In other words, the main transmission direction is oriented opposite to a vertical direction, wherein the vertical direction can be oriented orthogonal to a (plane) surface of the route on which the vehicle travels and points from the surface to the vehicle. This advantageously allows the reception of the first and the second signal only if a distance from the vehicle-sided transmitters to primary-sided receiving means is small. In particular, if the receiving means is integrated into a primary unit, e.g. a body of the primary unit, this advantageously allows guaranteeing that the vehicle, in particular the secondary unit of the vehicle, is positioned close to the primary unit.

A position of the secondary winding structure can e.g. be provided by a position of a centre point of the secondary winding structure, in particular a geometric centre point. A position of the primary winding structure can also be provided by, in particular geometric, centre point of the primary winding structure. It is, however, possible to use any reference point with a known spatial relation to the primary winding structure or secondary winding structure.

An orientation of the vehicle can be provided by an orientation of a longitudinal axis of the secondary winding structure. This longitudinal axis can e.g. correspond to a longitudinal axis of the vehicle which can also be denoted as roll axis. In particular, the longitudinal axis can point into direction of travel if the vehicle moves forward on a flat driving surface. Further, a vertical axis of the secondary-sided coordinate system can be oriented orthogonal to a surface of the route on which the vehicle travels. The vertical axis can correspond to a yaw axis of the vehicle. A lateral axis can be oriented orthogonal to the aforementioned longitudinal and vertical axes. The lateral axis can correspond to a pitch axis of the vehicle.

To determine at least the correct position, only one transmitter and only one receiving means is theoretically necessary. In this case, at least the correct position of the secondary winding structure of the secondary unit relative to the primary winding structure of the primary unit can be detected depending on a signal transmitted by the single transmitter to the single receiving means.

According to the invention, a correct position and/or orientation of the secondary winding structure of the secondary unit relative to the primary winding structure of the primary unit is determined depending on a carrier signal level of the received signal. To transmit data from the vehicle to wayside control unit, a carrier signal can be modulated in order to encode said data. Thus, the first and the second signal can be provided by a carrier signal modulated with a data signal. In particular, the data signal can be modulated onto the carrier signal by a phase modulation. Thus, data is encoded as variations in the instantaneous phase of the carrier signal, in particular a carrier wave. More particularly, a binary phase modulation, e.g. a binary phase modulation, also known as a binary phase shift keying can be used. The carrier signal can have a frequency of 405 kHz. To transmit data, different transmission rates can be realized by using the said carrier signal. For instance, a transmission rate of 4.5 kbit/s can be used.

Further, a signal level of the received signal can be determined. The signal level can be the carrier signal level of the received signal or the carrier signal level can be determined based on said signal level.

In particular, the frequency of the carrier signal can be chosen such that the frequency is located in between harmonics of the operating frequency of the primary winding structure, wherein the operating frequency can be in the range of 20 kHz to 300 kHz.

As will be explained later, the correct position and/or orientation can e.g. be determined depending on a time course of the carrier signal level.

Using the carrier signal level to detect the correct position and/or orientation advantageously allows a robust and reliable detection.

In another embodiment, a transmitting power of the first and the second signal is constant. This means that the transmitting power does not vary with time. The transmitting power of the first signal can be equal to or different from the transmitting power of the second signal. The constant transmitting power can be known or be determinable on the wayside, e.g. by the wayside control unit. Further, the received power of the signal received by the at least one receiving means can be determined. Depending on the known and constant value of the transmitting power and the value of the received power, a distance between the secondary unit and the primary unit can be determined or estimated. The distance value can then be used in order to control a positioning procedure of the secondary winding structure relative to the primary winding structure and/or to control the inductive power transfer process, e.g. an enabling or disabling the power transfer and/or adjusting the transmitting power of the inductive power transfer.

In another preferred embodiment, the wayside control unit comprises only one receiving means. In particular, the wayside control unit comprises only one antenna for receiving the at least first and second signal. The receiving means can e.g. be designed as an antenna loop. The antenna loop can be integrated into the primary unit, e.g. a body of the primary unit. Further, the primary winding structure can be integrated into the primary unit.

A longitudinal axis of a primary-sided coordinate system can be oriented parallel to a longitudinal axis of the primary winding structure. Said longitudinal axis can correspond to a direction of travel of the vehicle if the vehicle travels straight forward across the primary unit. Further, a vertical axis can be oriented orthogonal to a surface of the route or an upper surface of the primary unit. A lateral axis can be oriented orthogonal to the aforementioned longitudinal and vertical axes.

With respect to the primary-sided coordinate system, the receiving means can be arranged laterally adjacent to the primary winding structure. This means that in a common plane of projection (which can be oriented perpendicular to the aforementioned vertical axis), there exists no overlap between an envelope of the primary winding structure and an envelope of the receiving means. More particular, a predetermined lateral displacement between a geometric center of the primary winding structure and the geometric center of the receiving means, e.g. the antenna loop, can be provided. Furthermore, the receiving means can have predetermined dimensions with respect to aforementioned axes. For instance, the antenna loop can have a predetermined length along the longitudinal axis and a predetermined width along the lateral axis. Preferably, the length of receiving means is greater than the maximal length of an envelope of the primary winding structure.

In a preferred configuration, there is a predetermined lateral displacement between a geometric center of the primary winding structure and the receiving means but no longitudinal displacement. This means, that the receiving means is arranged to the right or to the left of the primary winding structure.

In another embodiment, the at least first signal and second signal are transmitted in an alternating sequence. In other words, only one of the at least two transmitters is activated at a certain point in time. A transmission time interval assigned to each transmitter can have a predetermined duration, e.g. 200 ms. Within this transmission time interval, data, e.g. in form of a bit sequence, can be transmitted using either the first signal or the second signal. It is, for instance, possible to transmit a predetermined number of datagrams or telegrams within the transmission time interval. A datagram can comprise a predetermined number of bits, e.g. 28 bit. A telegram can consist of a predetermined number of consecutive datagrams, e.g. 16 datagrams.

Alternating means that during a first transmission time interval, the first transmitter transmits data using the first signal. After an end point of the transmission time interval, i.e. an end of the transmission duration time assigned to the first transmitter, the first transmitter is deactivated and a second transmitter is activated. In a consecutive transmission time interval, the second transmitter transmits data using the second signal (i.e. during a transmission duration time assigned to the second transmitter).

Especially in the case, wherein the wayside control unit comprises only a single receiving means, the alternating sequence of the first and the second signal advantageously allows a reliable discrimination of reception of the first and the second signal by the receiving means.

In another embodiment the reception of the signal which has been received last is terminated at a switching point, wherein the other signal is received only after a time gap with a predetermined duration after the switching point. The signal which has been received last can e.g. be the first signal. In this case, the other signal is the second signal.

The switching point denotes a point in time at which the transmitter activated last is deactivated.

For example, an activated transmitter can be deactivated if a transmission duration assigned to the transmitter has expired. The transmission duration can correspond to the duration of the aforementioned transmission time interval. In other words, the first transmitter can be deactivated at an endpoint of the aforementioned transmission time interval, wherein this end point corresponds to the switching point.

The remaining transmitter can be activated after a predetermined time gap after the deactivation. In this case, for a predetermined duration of the time gap, both transmitters are deactivated. After the time duration of the time gap has expired, the remaining transmitter is activated.

It is, however, also possible to immediately activate the remaining transmitter at the switching point. In this case, however, the remaining transmitter starts to transmit a signal after the time gap. The time gap can be a controlled time gap, wherein the start of transmission is only enabled after the time gap with a predetermined duration has passed. Also, the time gap can be generated due to e.g. signal delays and/or traveltimes.

As a result, a time gap occurs within the signal received by the at least one receiving means and thus within the received data stream. During the time gap, neither the first nor the second signal is received. Thus, a carrier signal level of the received signal can be minimal during the time gap.

This advantageously minimizes disturbances of the received signals due to e.g. a simultaneous activation of the first and the second transmitter.

In another embodiment, a correct position and/or orientation of the secondary winding structure relative to the primary winding structure is detected if a time course of the carrier signal level of the received signal matches an expected time course for a time duration which equals to or is greater than a transmission time interval assigned to the first transmitter or a transmission time interval assigned to the second transmitter. It is, for instance, possible to compare a carrier signal level of the received signal with at least one threshold value, preferably with two threshold values enclosing a predetermined threshold interval. If the carrier signal level of the received signal is higher than a predetermined threshold value or lies within the aforementioned interval for the previously described time duration, a robust reception of the first and the second signal and thus a correct position and/or orientation can be detected.

Preferably, the time course of the carrier signal level of the received signal is analyzed for a time duration which equals to or is greater than a sum of the transmission time intervals assigned to the at least first and second transmitter. This advantageously allows detecting a robust reception of the first and the second signal, which, in turn, means that the first and the second transmitter are located with a correct position and/or orientation relative to the receiving means (which in turn means that the secondary winding structure is arranged with a correct position and/or orientation relative to the primary winding structure).

It is, of course, possible to consider the aforementioned time gap between two consecutive transmission time intervals when analyzing if the time course of the carrier signal level of the received signal matches an expected time course. The aforementioned threshold value or the aforementioned threshold interval can e.g. vary time-dependent. This allows e.g. to consider the aforementioned time gaps.

In another embodiment, an incorrect position and/or orientation of the secondary winding structure relative to the primary winding structure is detected if the time course of the carrier signal level of the received signal does not match an expected time course. The incorrect position and/or orientation can be detected immediately. Alternatively, the incorrect position and/or orientation can be detected after a predetermined timeout interval. A mismatch between the time course of the carrier signal level of the receipt signal and the expected time course can e.g. be detected if the carrier signal level is lower than the predetermined threshold value or lies outside the aforementioned threshold interval. Alternatively, a mismatch can be detected if e.g. an absolute value of the difference between the carrier signal level and an expected signal level is higher than a predetermined threshold value. In case of a detection of such a mismatch, an incorrect position and/or orientation can be immediately detected and signaled to e.g. an evaluation unit. As explained before, an incorrect position and/or orientation can alternatively be detected (and signaled) if the mismatch exists for the predetermined timeout interval. This advantageously increases a robustness of the proposed detection.

In preferred embodiment, authentication-related data is transmitted from the vehicle to the wayside control unit by the first signal and/or the second signal. An authorization for a power transfer to the vehicle is determined based on the authentication-related data. For example, the first and/or the second signal can encode an identifier of the vehicle or, as will be explained later, an identifier of the respective transmitter. Such an identifier can be a unique identifier. The wayside control unit decodes the identifier and compares the decoded identifier with a set of authorized identifiers. Only if the decoded identifier matches one of the authorized identifiers, the vehicle can be classified as an authorized vehicle. Only in this case, the power transfer to the vehicle can be enabled. This further increases a functional safety of the inductive power transfer.

In a preferred embodiment, an identifier of the first transmitter is transmitted by the first signal and/or an identifier of the second transmitter is transmitted by the second signal. In this case, a vehicle can be categorized as an authorized vehicle for inductive power transfer if the identifiers of both transmitters are categorized as authorized identifiers. Thus, vehicle can be identified based on the, in particular unique, identifiers of its transmitters.

This advantageously further increases a functional safety as the transmission of transmitter-specific identifiers allows a discrimination of the first and the second transmitter by the wayside control unit. Thus, authorization is not determined if only one of the first and the second signal is received by the receiving means.

In another embodiment, authorization is approved if an expected number of correct identifiers of the first transmitter is detected within a time duration which equals to or is greater than the transmission time interval assigned to the first transmitter and if an expected number of correct identifiers of the second transmitter is detected within a time duration which equals to or is greater than the transmission time interval assigned to the second transmitter. This especially applies if the first and the second signal are transmitted in an alternating sequence.

Within their transmission time interval, the respective identifier can be transmitted only once or, preferably, repeatedly. It is for instance possible, to transmit an identifier within each datagram of a telegram transmitted by the respective transmitter. If e.g. a telegram consists of 16 consecutive datagrams and a transmission time interval is chosen twice the time duration of a telegram, 32 correct identifiers of the first the second transmitter have to be detected in order to approve an authorization.

The authorization for power transfer can also be approved if the correct identifier is transmitted with predetermined repetition rate, e.g. every 28 bits. Another criterion for approval is that the same identifier is detected during one transmission time interval. Another criterion for approval is that the identifiers detected in consecutive transmission time intervals are different from each other. Another criterion for approval can be based on the duration of the transmission time interval, in particular a duration of a transmitter-specific transmission time interval. A beginning of a transmission time interval can be detected based on a signal level, e.g. by detecting a rising edge of a bit stream signal, in particular of a digitized level-dependent signal. An end of the transmission time interval can also be detected based on a signal level, e.g. by detecting a falling edge of the said bit stream signal. The identity of the transmitter can e.g. be detected by analyzing the data content of the transmitted signal, e.g. by analyzing at least one identifier encoded within the transmitted signal. The authorization for power transfer can then be approved if the duration equals to a predetermined transmitter-specific duration or does not differ more than a predetermined amount. The duration-dependent criterion can thus be evaluated depending on the transmitted signal level and, if applicable, the transmitted signal content.

Another criterion for approval can be based on the duration of the time gap between the two consecutive transmission time intervals. A beginning of a time gap can be detected based on a signal level, e.g. by detecting a falling edge of a bit stream signal, in particular of a digitized level-dependent signal. An end of the time gap can also be detected based on a signal level, e.g. by detecting a rising edge of the said bit stream signal. The gap-dependent criterion can thus be evaluated depending on the transmitted signal level.

This advantageously further increases the functional safety of detecting an authorized vehicle.

In another embodiment, the authorization for power transfer is disapproved if a number of correct identifiers different from an expected number of correct identifiers, in particular no correct identifiers, of the first transmitter or the second transmitter is detected within an expected time duration. The authorization is disapproved immediately or after a predetermined timeout interval. Corresponding to the consideration of the timeout interval in case of analyzing the time course of the carrier signal level of the received signal level, the consideration of a predetermined timeout interval in case of analyzing identifiers increases a robustness of detection of an authorized vehicle advantageously.

In another embodiment, an analysis of the received signal is performed on two channels. This advantageously provides a redundant analysis of the received signal, in particular a redundant analysis of the carrier signal level and analysis of the transmitted identifiers. This increases a safety level of the proposed method. To perform the analysis of the received signal on two channels, one or preferably multiple functions of the wayside control unit can be implemented on two channels. It is for instance possible to split the received signal, wherein a signal filtering, a detection of the signal carrier level and the analysis of the signal carrier level is performed independently within each of the two channels.

In a preferred embodiment, an inductive power transfer is only enabled if a correct position and/or orientation of the secondary winding structure relative to the primary winding structure is determined and an authorization for power transfer of the vehicle is approved. If only one of the aforementioned criteria is not fulfilled, no inductive power transfer can be performed between a wayside primary unit and the vehicle.

It is for instance possible that switching means for switching a power supply of a driving unit are controlled depending on a positioned-dependent signal and an authorization-dependent signal such that the primary winding structure is only powerable if a correct position and/or orientation and an approved authorization is detected. The driving unit can e.g. be a unit for controlling switching elements or gates of a wayside power converter by which the primary winding structure is operated.

The position-dependent signal can be generated by the wayside control unit if a correct position and/or orientation is detected. The authorization-dependent signal can be generated by the wayside control unit if a correct authorization is detected.

It is also possible that a detection signal is generated depending on the position-dependent signal and the authorization-dependent signal, wherein detection signal takes a first predetermined value if a correct position and/or orientation and an approved authorization is detected and another value if an incorrect position and/or orientation and/or an non-approved authorization is detected. Such a detection signal can be generated by the wayside control unit. Moreover, said signal can be used to control switching states of the aforementioned switching elements.

Further proposed is a vehicle comprising a secondary unit of a system for inductive power transfer for receiving an alternating electromagnetic field. The vehicle comprises at least a first transmitter for transmitting a first signal and a second transmitter for transmitting a second signal. A wayside control unit can comprise at least one receiving means for receiving the first and the second signal. The secondary unit can comprise a secondary winding structure.

According to the invention, the at least first and second transmitter are designed and/or arranged with respect to a secondary winding structure of the secondary unit and with respect to the at least one receiving means such that a correct or an incorrect position and/or orientation of the secondary winding structure relative to the primary winding structure is unambiguously determinable depending at least on the first and the second signal. This means that the at least first and second transmitter are designed and/or arranged, e.g. on the secondary side or on the vehicle side, such that a correct or an incorrect position and/or orientation of the secondary winding structure relative to the primary winding structure is unambiguously determinable depending at least on the first and the second signal. In particular, the at least first and second transmitter are designed and/or arranged with respect to a secondary winding structure of the secondary unit and depending on the arrangement of the at least one receiving means on the wayside such that a correct or an incorrect position and/or orientation of the secondary winding structure relative to the primary winding structure is unambiguously determinable depending at least on the first and the second signal.

Further, a signal level of the received signal is determinable, wherein a correct or an incorrect position and/or orientation of the secondary winding structure of the secondary unit relative to the primary winding structure of the primary unit is determinable depending on the carrier signal level of the received signal. In particular, the at least first and second transmitter are designed and/or arranged on the secondary side or vehicle side, e.g. with respect to a secondary winding structure of the secondary unit and depending on the arrangement of the at least one receiving means on the wayside, such that a signal level of the received signal is determinable, wherein a correct or an incorrect position and/or orientation of the secondary winding structure of the secondary unit relative to the primary winding structure of the primary unit is determinable depending on the carrier signal level of the received signal.

The vehicle advantageously allows performing a method according to one of the embodiments described in this invention.

In other words, a knowledge of the geometric arrangement and/or design of the first and second transmitter, in particular the knowledge of the geometric arrangement relative to the secondary winding structure, is useable to unambiguously determine if the secondary winding structure is correctly positioned and/or orientated relative to the primary winding structure depending on a reception of the first and the second signal.

The arrangement and/or design of the first and the second transmitter has to be adapted to the arrangement and/or design of the at least one receiving means.

It is for instance possible to arrange the first and the second transmitter, in particular geometric centres of each transmitter, with a predetermined distance along a longitudinal axis of the vehicle. Also, the transmitters, in particular the centres of the transmitters, can be arranged with no lateral displacement along the longitudinal axis of the vehicle.

The predetermined distance along the longitudinal axis can be equal to or smaller than the aforementioned length of an antenna loop providing the receiving means. In particular, the distance between the transmitters along the longitudinal axis can take a predetermined percentage, e.g. 70%, 80%, 90% or even 95% of the length of the antenna loop.

As in the case of the receiving means and the primary winding structure, the first and the second transmitter can be arranged with a predetermined lateral displacement relative to the secondary winding structure, e.g. a centre of the secondary winding structure. The first and the second transmitter can also be arranged with a predetermined longitudinal displacement to secondary winding structure. Also, the first and the second transmitter can be arranged outside envelope of the secondary winding structure, in particular if the secondary winding structure and the first and the second transmitter are projected into a common plane of projection which can be oriented orthogonal to a vertical axis of the vehicle.

Further proposed is a wayside control unit of a system for inductive power transfer to a vehicle. The control unit can control a generation of an alternating electromagnetic field by a primary unit of the system for inductive power transfer. The control unit comprises at least one receiving means for receiving at least a first and a second signal, wherein the first signal is transmitted by a first transmitter of the vehicle and the second signal is transmitted by a second transmitter of the vehicle. Further, the vehicle can comprise a secondary unit with a secondary winding structure for receiving the alternating electromagnetic field.

According to the invention, the at least one receiving means is designed and/or arranged with respect to a primary winding structure of a primary unit and with respect to the at least first and second transmitter such that a correct or an incorrect position and/or orientation of the secondary winding structure relative to the primary winding structure is unambiguously determinable depending at least on the first and the second signal. This means that the at least one receiving means is designed and/or arranged, e.g. on the wayside, such that a correct or an incorrect position and/or orientation of the secondary winding structure relative to the primary winding structure is unambiguously determinable depending at least on the first and the second signal. In particular, the at least one receiving means is designed and/or arranged with respect to a primary winding structure of a primary unit and depending on the arrangement of the at least first and second transmitter on the vehicle such that a correct or an incorrect position and/or orientation of the secondary winding structure relative to the primary winding structure is unambiguously determinable depending at least on the first and the second signal.

Further, a signal level of the received signal is determinable, wherein a correct or an incorrect position and/or orientation of the secondary winding structure of the secondary unit relative to the primary winding structure of the primary unit is determinable depending on the carrier signal level of the received signal. In particular, the at least one receiving means is designed and/or arranged on the wayside, e.g. with respect to a primary winding structure of a primary unit and depending on the arrangement of the at least first and second transmitter on the vehicle, such that a signal level of the received signal is determinable, wherein a correct or an incorrect position and/or orientation of the secondary winding structure of the secondary unit relative to the primary winding structure of the primary unit is determinable depending on the carrier signal level of the received signal.

The wayside control unit advantageously allows performing a method according to one of the embodiments described in this invention.

In other words, the receiving means can be arranged with a known geometric configuration relative to the primary winding structure. Also, the design and/or arrangement of the at least one receiving means can be adapted to a design and/or arrangement of the at least first and second transmitter. In particular, the design or arrangement of the at least one receiving means can be chosen such that the first and the second signal can only be received if the secondary winding structure is correctly positioned and/or orientated with respect to the primary winding structure. This advantageously provides a wayside control unit which is able to detect a correct position and/or orientation which, in turn, improves a functional safety of the system for inductive power transfer.

In another embodiment, the control unit comprises at least one means for generating an analogue level-dependent signal, wherein the level-dependent signal represents the carrier signal level of the received signal.

The analogue level-dependent signal denotes a DC voltage or a DC current signal which is generated by rectifying a portion of the received signal having a predetermined single frequency or a portion of the received signal within a predetermined frequency range. A value of the analogue level-dependent signal is proportional to an amplitude of said portion of the received signal.

This advantageously provides a level-dependent signal representing the carrier signal level of the received signal which can be easily digitized and analyzed.

In another embodiment, the control unit comprises at least one A/D converter for generating a digital signal from the received signal and/or the analogue level-dependent signal. Preferably, both, the received signal and the analogue level-dependent signal are digitized. Then, the digitized level-dependent signal can be used to analyse the carrier signal level in order to detect a correct or incorrect position and/or orientation. The digitized received signal can be used to decode information or data transmitted by the first and the second signal, wherein said data can be used to detect an authorized vehicle.

This advantageously allows evaluating both, a correct or incorrect position and/or orientation and a correct or incorrect authorization, wherein digital signal processing can be performed.

In another embodiment, the control unit comprises at least one evaluation unit for determining a correct or incorrect position and/or orientation of the secondary winding structure relative to the primary winding structure. Said detection can be performed depending on the analogue-level dependent signal, in particular a digitized analogue level-dependent signal. Additionally or alternatively, the evaluation unit can be used for detecting an authorization for power transfer to the vehicle. Said detection can be performed based on the received signal, in particular based on a digitized received signal. In particular, the detection of a correct or incorrect authorization can be a content-based detection, wherein a data content of the received signal is determined and evaluated.

Also, the control unit can comprise at least one signal generating means for generating a position-dependent signal and/or an authorization-dependent signal. Said signal(s) can be used to control a power supply of the primary winding structure, in particular switching states of switching elements of the aforementioned driving unit, and/or for activation of a wayside power converter.

In another embodiment, the control unit comprises at least one switching means for switching a power supply of a driving unit for controlling switching elements of a wayside power converter by which the primary winding structure is operated. The aforementioned position-dependent signal can be used as a control signal for the switching means. It is for instance possible that the switching elements are closed if the position-dependent signal takes a first value. If the position-dependent signal takes another value, the switching elements are opened. Additionally, the authorization-dependent signal is used as a control signal for the switching means. In a preferred embodiment, the aforementioned detection signal is used as a control signal for the switching means.

The position-dependent signal and/or the authorization-dependent signal or the detection signal can also be used to control an activation or deactivation of the wayside power converter.

In another embodiment, the control unit is designed at least partially as a two-channel control unit, wherein an analysis of the received signal is performable on two channels. This advantageously increases a functional safety of a detection of a correct position and/or orientation and/or a detection of a correct/incorrect authorization.

Further, the control unit can comprise an interface means for a communication with other wayside elements or components such as the wayside power converter, a DC/DC-converter or a control unit of a cooling system of the wayside elements, such as the wayside power converter or the wayside control unit. The interface means can provide a serial communication link. Also, the interface can provide a bus interface to predetermined bus system, e.g. a CAN bus. The interface means can be connected to the at least one evaluation unit.

Further proposed is an arrangement of a vehicle according to the aforementioned embodiment and a wayside control unit according to one of the aforementioned embodiments.

The arrangement advantageously allows performing a method according to one of the embodiments described in this invention.

BRIEF DESCRIPTION OF THE DRAWINGS

The invention will be described with reference to the attached figures. The attached figures show.

DETAILED DESCRIPTION OF THE INVENTION

Figure 1:
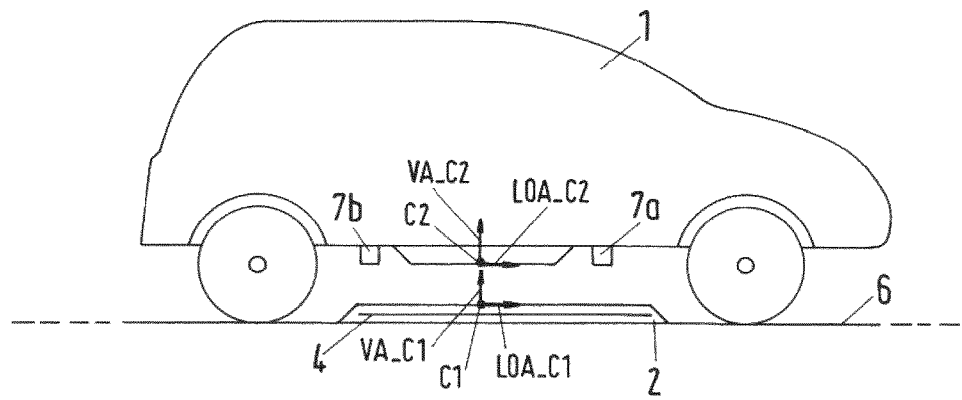
FIG. 1 a schematic side view of a vehicle and a primary unit.

FIG. 1 shows a schematic side view of a vehicle 1 and a primary unit 2 of a system for inductive power transfer. The primary unit 2 comprises a primary winding structure 3 (see FIG. 2). Furthermore, the primary unit 2 comprises an antenna loop 4 which is shown in detail in FIG. 5. The primary unit 2 is installed on a surface 6 of a route. The primary unit 2 can e.g. provide an elevated charging pad.

Figure 2:
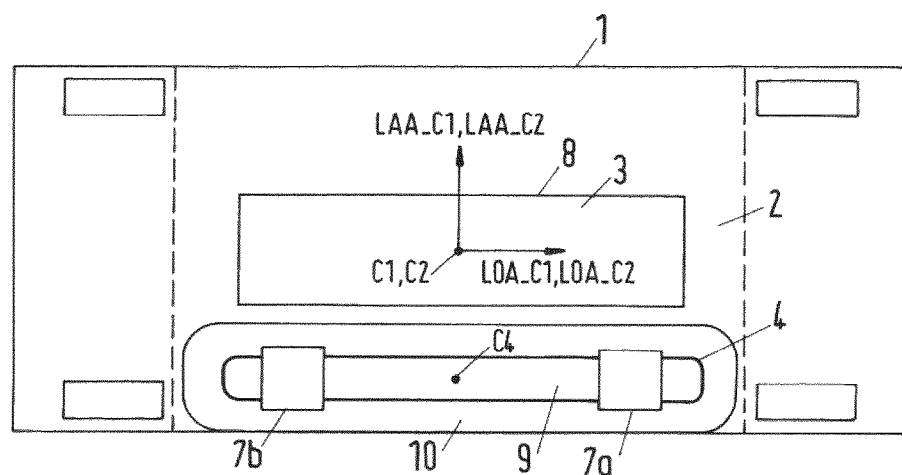
FIG. 2 a schematic top view of the primary unit and the vehicle shown in FIG. 1, FIG. 3 a schematic block diagram of a vehicle detection system, FIG. 4 a schematic block diagram of a vehicle-sided transmitter, FIG. 5 a schematic view of an antenna loop, FIG. 6 a schematic block diagram of an analogue part of a receiver unit, FIG. 7 a schematic flow chart of a generation of an analogue level-dependent signal, FIG. 8 an exemplary format of a datagram, FIG. 9 an exemplary magic word pattern, FIG. 10 an exemplary format of a telegram, FIG. 11 a switch over between the first and the second signal, FIG. 12 a course of a level-dependent signal for different geometric arrangements of a transmitter and an antenna loop, FIG. 13a a schematic top view of a vehicle in a wrong position, FIG. 13b a schematic top view of a vehicle in another wrong position and FIG. 14 a schematic top view of the primary unit and a vehicle in another embodiment.

Shown is a primary-sided coordinate system C1. Shown is a vertical axis VA_C1, wherein the vertical axis extends perpendicular to the surface 6 of the route. Further shown is a longitudinal axis LOA_C1 which extends into a longitudinal direction. The longitudinal axis can extend parallel to a longitudinal axis of a primary unit 2. Shown in FIG. 2 is a lateral axis LAA_C1, which extends perpendicular to the vertical axis VA_C1 and the longitudinal axis LOA_C1 of the primary-sided coordinate system C1. The primary coordinate system C1 is originated at a geometric center of the primary winding structure 3.

Further shown is a vehicle-sided coordinate system C2. The vehicle-sided coordinate system C2 comprises a vertical axis VA_C2 which corresponds to a yaw axis of the vehicle 1. Further shown is a longitudinal axis LOA_C2 which is oriented parallel to a roll axis of the vehicle 1. Shown in FIG. 2 is a lateral axis LAA_C2 which extends perpendicular to the vertical axis VA_C2 and the longitudinal axis LOA_C2 of the vehicle-sided coordinate system C2.

Further shown is a first transmitter 7a and a second transmitter 7b which are installed at a bottom side of the vehicle 1. A main transmission direction of each transmitter 7a, 7b is directed opposite to the direction of the vertical axis VA_C2 of the vehicle 1.

A position, in particular a position of a geometric centre, and/or orientation of the transmitters 7a, 7b relative to the vehicle-sided coordinate system C2 and thus relative to the secondary winding structure, in particular to a position of a geometric centre of the secondary winding structure, is known. Also, a position and/or orientation of the antenna loop 4, in particular a position of a geometric centre C4 of the antenna loop 4, relative to the primary-sided coordinate system C1 and thus relative to the primary winding structure 3, in particular to a geometric centre of the primary winding structure 3, is known.

FIG. 2 shows a schematic top view on the vehicle 1 and the primary unit 2 shown in FIG. 1. It is shown the vehicle-sided coordinate system C2 and the primary-sided coordinate system C1 cover each other in a common plane of projection which is oriented perpendicular to the vertical axes VA_C1, VA_C2 (see FIG. 1). Also shown is a primary winding structure 3 and an envelope 8 of the primary winding structure 3.

Further shown is the primary-sided antenna loop 4 and a vehicle-sided first transmitter 7a and second transmitter 7b. It is shown that the transmitters 7a, 7b are arranged at least partially over a detection area 10, in particular over an inner surface 9 enclosed by the antenna loop 4. The detection area 10 is an area assigned to the antenna loop 4, wherein signals 13a, 13b (see FIG. 3) emitted by the first and the second transmitter 7a, 7b can be received by the antenna loop 4 only if the respective transmitter 7a, 7b is arranged at least partially, preferably fully, over the detection area 10 and with a vertical distance smaller than predetermined maximal distance. The detection area 10 can be larger than the inner area 9 of the antenna loop 4. Thus, the detection area 10 can denote an area, wherein only signals 13a, 13b emitted by transmitters which are located over the detection area 10 with a vertical distance smaller than predetermined maximal distance are receivable by the antenna loop 4.

Thus, a first signal 13a transmitted by the first transmitter 7a and directed in the main transmission direction of the first transmitter 7a can be received by the antenna loop 4. Correspondingly, a second signal 13b transmitted by the second transmitter 7b and directed into the main transmission direction of the second transmitter 7b can also be received by the antenna loop 4.

Shown are also lateral axes LAA_C1, LAA_C2 of the vehicle-sided coordinate system C2 and the primary-sided coordinate system C1. It is shown that the detection area 10 of the antenna loop 4 is arranged beside the envelope 8 of the primary winding structure 3. A geometric center C4 of the antenna loop 4 is arranged with a predetermined lateral distance from geometric center of the primary-sided coordinate system C1.

If the vehicle is not correctly positioned over the primary unit 2, at least one of the transmitters 7a, 7b can be arranged outside the detection area 10 in a common plane of projection which can be oriented perpendicular to the aforementioned vertical axes VA_C1, VA_C2. In this case, at least one of the group of the first and the second signal 13a, 13b cannot be received by the antenna loop 4. In this case, an incorrect position and/or orientation of primary winding structure 3 relative to the secondary winding structure (not shown) can be detected. In turn, only in the case where both the first and the second transmitter 7a, 7b, are located over detection area 10 and their signals 13a, 13b are received by the antenna loop 4, a correct position and/or orientation of the primary winding structure 3 and the secondary winding structure (not shown) can be detected.

Figure 3:
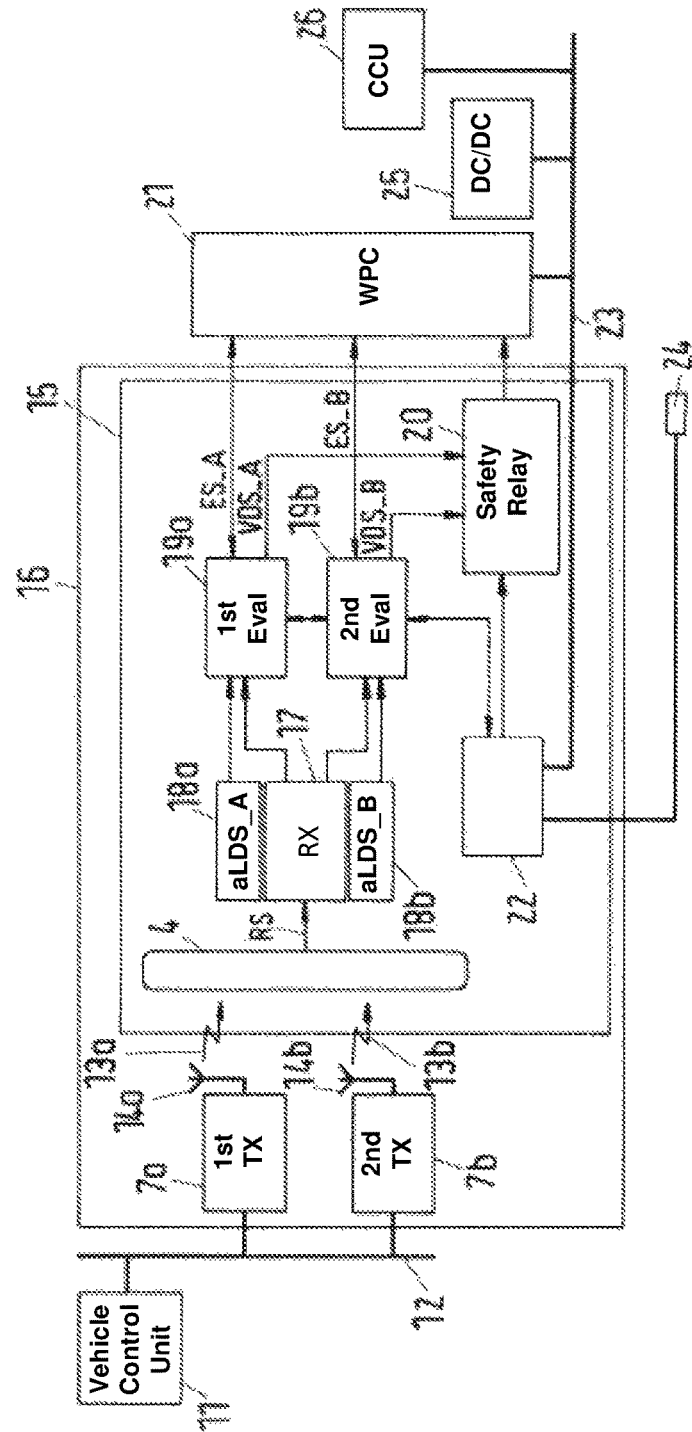

FIG. 3 shows a schematic block diagram of a vehicle detection system. Shown is a vehicle-sided control unit 11, which controls an operation of the first transmitter 7a and the second transmitter 7b. The transmitters 7a, 7b and the vehicle-sided control unit 11 are connected via a bus system 12, e.g. a CAN bus. The vehicle-sided control unit 11 triggers a start and termination of the operation of the transmitters 7a, 7b. In particular, the vehicle-sided control unit 11 activates and deactivates the transmitters 7a, 7b. During an activated state of operation, the respective transmitter 7a, 7b transmits a signal 13a, 13b. Schematically shown are antenna elements 14a, 14b of the transmitters 7a, 7b. The shown vehicle detection system provides at least a part of a proposed arrangement 16 of a vehicle 1 (see FIG. 1) and a wayside control unit 15.

It is shown that the wayside control unit 15 comprises the antenna loop 4 which receives the first and the second signal 13a, 13b. The received signal RS is transmitted to a receiver unit 17. The receiver unit 17 comprises first means 18a for generating an analogue level-dependent signal aLDS_A (see FIG. 6), wherein the level-dependent signal aLDS_A represent a carrier signal level of the received signal RS. Further, the receiver unit 17 comprises second means 18b for generating an analogue level-dependent signal aLDS_B. Thus, the level-dependent signal is generated redundantly, in particular within two channels provided by the receiver unit 17.

Further, the wayside control unit 15 comprises a first evaluation unit 19a and a second evaluation unit 19b. The first evaluation unit 19a analyzes the level-dependent signal aLDS_A provided by the first means 18a for generating an analogue level-dependent signal aLDS_A and also analyzes the received signal RS which is provided by the receiver unit 17. The second evaluation unit 19b analyzes the level-dependent signal aLDS_B provided by the second means 18b for generating a level-dependent signal. Thus, a redundant evaluation or analysis of the signals is provided.

Furthermore, the wayside control unit 15 comprises a safety relay 20, wherein the safety relay 20 controls the power supply to a wayside power converter 21. Control signals for controlling a state of the safety relay 20 are generated by the evaluation units 19a, 19b based on the level-dependent signals aLDS_A, aLD_B. and the received signal RS, in particular based on a data content of the received signal RS.

Further, the wayside control unit 15 comprises an interface unit 22 which provides a communication interface between the wayside control unit 15, in particular the first and the second evaluation unit 19a, 19b and a primary-sided bus system 23, e.g. a CAN bus, and further external elements 24, e.g. via TCP/IP. It is shown that the wayside power converter 21, a DC/DC-converter 25 and a wayside CCU 26 are also connected to the bus system 23.

Schematically shown are signals and/or data connections between the receiver unit 17 and the evaluation units 19a, 19b. Also shown is a data connection between the first and the second evaluation unit 19a, 19b. Interfaces providing the data communication can e.g. be designed as an SPI interface.

Further shown is a signal and/or data communication between the first evaluation unit 19a and the wayside power converter 21 and the second evaluation unit 19b and the wayside power converter 21. Via said signal and/or data communication, an enable or disable signal ES_A, ES_B for the wayside power converter 21 can be transmitted.

Also shown is a signal and/or data communication between the safety relay 20 and each of the evaluation units

19a, 19b. Via this signal and/or data communication a vehicle detection signal VDS_A, VDS_B can be transmitted from the evaluation units 19a, 19b to the safety relay 20. Also shown is a signal and/or data communication between the second evaluation unit 19b and the interface unit 22. Further shown is a signal and/or data communication between the interface unit 22 and the safety relay 20.

Figure 4:
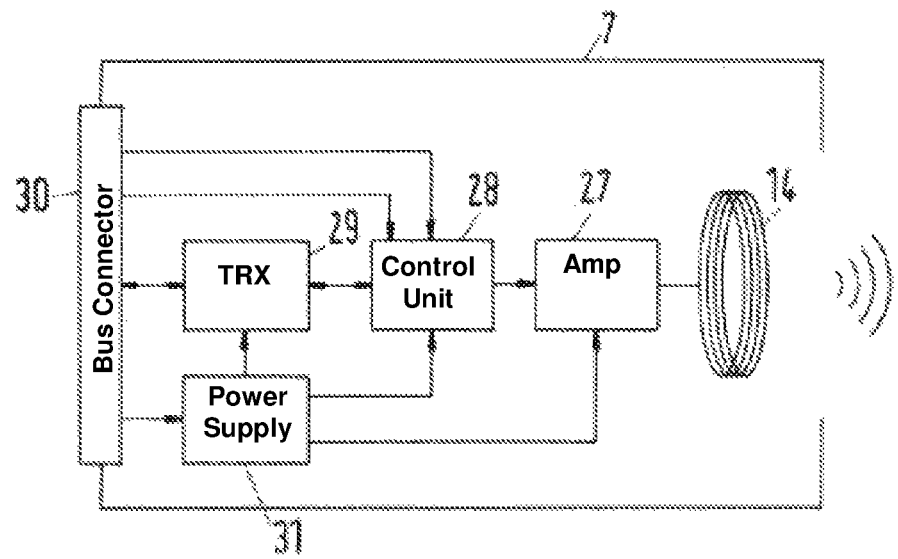

FIG. 4 shows a schematic block diagram of a transmitter 7. A transmitter 7 comprises an antenna element 14, e.g. designed as a TX-antenna. Further, the transmitter 7 comprises an amplifier 27 and a control unit 28. The control unit 28 generates a signal applied to the antenna element 14 via the amplifier 27. Further, the transmitter 7 comprises a bus transceiver unit 29 and a bus connector 30, wherein the control unit 28 is connected to a vehicle-sided bus system 12 (see FIG. 3) via the connector 30 and the transceiver unit 29. Also shown is a power supply unit 31 of the transmitter 7 which supplies power to the bus transceiver unit 29, the control unit 28 and the amplifier 27. Further shown are direct communication paths from the connector 30 to the control unit 28 by which a type of the transmitter 7 and address the transmitter 7 can be supplied to the control unit 28. The direct communication paths between the connector 30 and the control unit 28 can e.g. be designed as hard wired communication path. The connector 30 also serves for a power connection of the power supply 31 to a vehicle-sided power supply.

The transmitter 7 receives data and commands from the vehicle-sided control unit 11 (see FIG. 3). The control unit 28 assembles and modulates a data stream which is then transmitted by the antenna element 14.

Figure 5:
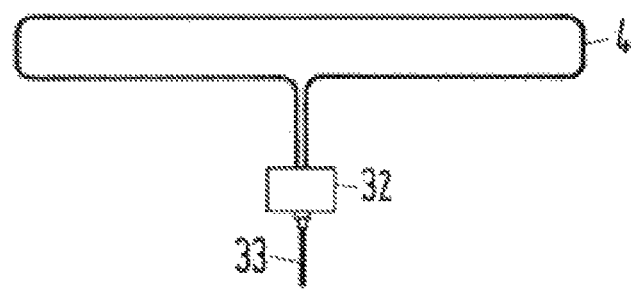

FIG. 5 shows a schematic view of the antenna loop 4. The antenna loop 4 can have a predetermined length along the longitudinal axis LOA_C1 of the primary-sided coordinate system C1 (see e.g. FIG. 2) and a predetermined width along the lateral axis LAA_C1 of the primary-sided coordinate system C1. Further shown is a matching network 32, wherein the matching network 32 is used to match the antenna loop 4 impedance to a predetermined impedance, e.g. 50Ω, of a connecting cable 33, e.g. a coax cable. In particular, the antenna loop 4 can be provided by a single winding, e.g. by a single copper wire with only one winding.

Figure 6:
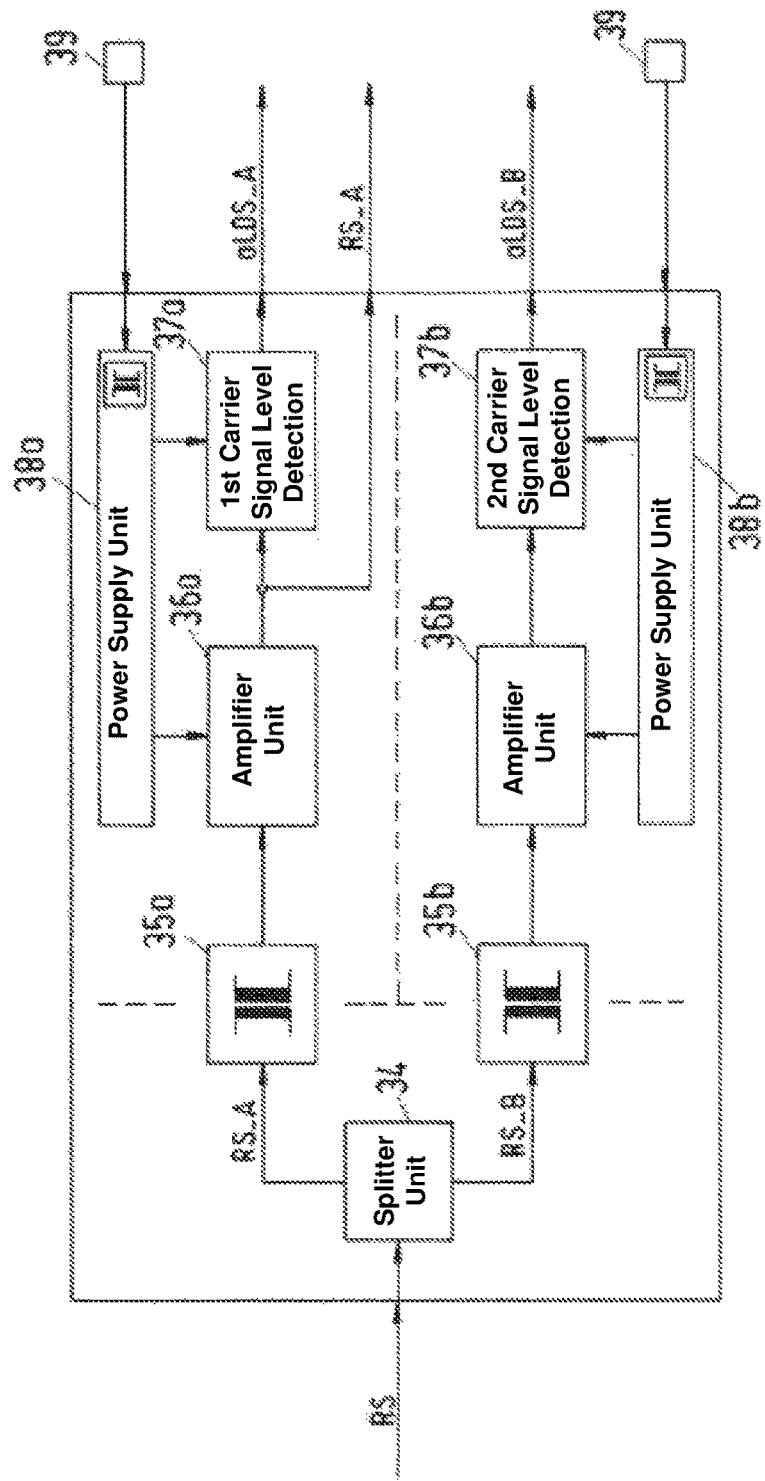

FIG. 6 shows a schematic block diagram of an analogue part of a receiver unit 17 (see FIG. 3). A received signal RS which is generated by an antenna loop 4 (see FIG. 3) is transmitted to a splitter unit 34 which splits received signal RS into a first part RS_A and a second part RS_B, wherein the first part RS_A is processed within a first channel and the second part RS_B is processed within a second channel provided by the wayside control unit 15 (see FIG. 3). It is important to note that the first and the second part RS_A, RS_B represent the same signal.

Both parts RS_A, RS_B are transmitted via galvanic separation units 35. Subsequently, the first and the second part RS_A, RS_B are filtered and amplified by filter and amplifier units 36a, 36b in order to remove disturbances which are coupled into the antenna loop 4.

Subsequently, a first carrier signal level detection unit 37a generates an analogue level-dependent signal aLDS_A depending on the analogue first part RS_A. The first carrier level signal detection unit 37a thus provides the first analogue level-dependent signal aLDS_A. Correspondingly, the second part RS_B is filtered by second carrier signal level detection unit 37b which provides a second analogue level-dependent signal aLDS_B. Within the carrier signal level detection performed by corresponding units 37a, 37b, a bandpass filtering, an amplification, a peak detection and another filtering step is performed. Further shown is that the analogue part of the receiver unit 17 also provides the filtered and amplified analogue received signal RS in form of the first part RS_A. Also shown are power supply units 38a, 38b which provide power to the filter and amplifier units 36a, 36b and the carrier signal level detection units 37a, 37b. It is shown that the power supply units 38a, 38b are supplied by external power supplies 39.

Figure 7:
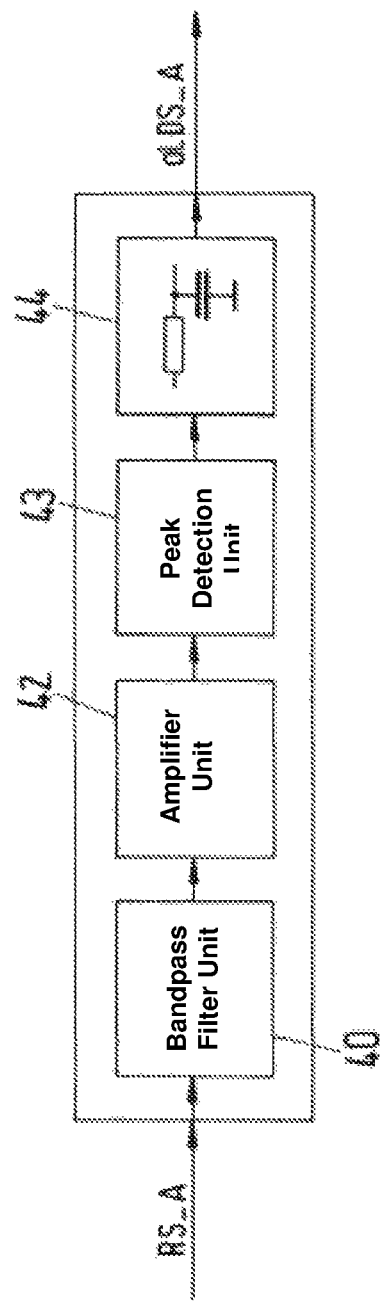

FIG. 7 shows a schematic flow chart of steps performed by a carrier signal level detection unit 37a, 37b (see FIG. 6). The analogue received signal RS, in this case the first part RS_A, is filtered by a bandpass filter unit 40 and amplified by an amplifier unit 42. Subsequently, a peak detection unit 43 detects a peak of the amplified signal. Subsequently, the signal is again filtered by another filter unit 44. The peak detection unit 43 and the filter unit 44 provide a rectifier for rectifying the analogue received signal RS which is an AC signal. The filter unit 44 is in particular used for reducing remaining ripples of the rectified signal provided by the peak detection unit 43. Subsequently, an analogue level-dependent signal aLDS_A is provided, wherein the analogue level-dependent signal aLDS_A is a DC signal.

Not shown is a digital part of the receiving unit 17 (see FIG. 3). A digital part can comprise several ADCs (analogue to digital converters) to digitize the analogue level-dependent signal aLDS_A (see FIG. 6), the analogue received signal RS_A and the analogue level-dependent signal aLDS_B. Each of the digitized received signals and the digitized level-dependent signals can e.g. be provided by a bit stream.

As shown in FIG. 3, the digital part can further comprise the first evaluation unit 19a and a second evaluation unit 19b (see FIG. 3), wherein the first evaluation unit 19a receives the digitized level-dependent signal dLDS_A and the digitized received signal dRS_A and the second evaluation unit 19b receives the digitized level-dependent signal dLDS_B and the digitized received signal dRS_A. The digitized received signal dRS_A can be received in an inverted form by the second evaluation unit 19b.

The receiver unit 17 can be realized by a microcontroller. Said microcontroller can be able to demodulate the received signal RS and recover the coded data and a clock signal of the resulting bit stream.

In FIG. 3, a communication interface between the first and the second evaluation unit 19a, 19b is shown which can be implemented as an SPI interface. In this case, the first evaluation unit 19a can act as a master for communication while the second evaluation unit 19b is synchronized with the first evaluation unit 19a using a synchronization signal transmitted between the evaluation units 19a, 19b. Furthermore, data can be transferred between the evaluation units 19a, 19b. The first and the second evaluation unit 19a, 19b can be designed as CPLD (complex programmable logic devices). These CPLD can provide the evaluation functions of the evaluation units 19a, 19b. Both evaluation units 19a, 19b analyze an incoming bit stream provided by digitized level-dependent signals and the digitized received signal. Thus, a content of the bit stream of the digitized received signal and the signal level of the carrier signal can be analyzed. Between the two evaluation units 19a, 19b, a cross monitoring function can be realized by the previously explained communication interface.

Based on the incoming signals, each evaluation unit 19a, 19b generates a vehicle detection signal VDS_A, VDS_B which is outputted by each evaluation unit 19a, 19b.

The vehicle detection signal VDS_A, VDS_B represents if an authorized and correctly positioned and/or orientated vehicle is arranged above a primary unit 2 (see FIG. 1). If the vehicle detection signal VDS_A, VDS_B takes a first value, an authorized vehicle 1 is detected, wherein the secondary winding structure of the vehicle 1 is correctly positioned and/or orientated with respect to a primary winding structure 3 of a primary unit 2 (see FIG. 2). If the vehicle detection signal VDS_A, VDS_B takes a value different from the first value, vehicle 1 is not authorized and/or not correctly positioned and/or orientated.

Further, the vehicle detection signals VDS_A, VDS_B are used to control switching elements of the safety relay 20 (see FIG. 3). To increase a functional safety, the vehicle detection signals VDS_A, VDS_B can be fed back to the other evaluation unit 19a, 19b respectively.

Based on the incoming signals, each evaluation unit 19a, 19b can also generate an enable signal ES_A, ES_B, which is transmitted to the wayside power converter 21 (see FIG. 3). As in the case of the vehicle detection signal VDS_A, VDS_B, the enable signal ES_A, ES_B takes a first value if an authorized and correctly positioned and/or orientated vehicle 1 is detected. In this case, the wayside power converter 21 is activated. In the case of an unauthorized and/or correctly positioned and/or orientated vehicle 1, the enable signal ES_A, ES_B takes a value different from the first value. In this case, the wayside power converter 21 is disabled.

Further shown in FIG. 3 is that the first evaluation unit 19a has a communication interface, e.g. an asynchronous serial interface, with the interface unit 22 (see FIG. 3). Via this communication interface, a current status of both evaluation units 19a, 19b, payload data of received telegram TG (see FIG. 12) can be transferred to other units. Each evaluation unit 19a, 19b can also output an inverted vehicle detection signal.

FIG. 3 also shows a safety relay 20. The purpose of the safety relay 20 is to switch on the power supply of a gate driver (not shown) of gates of the wayside power converter 21 (see FIG. 3). In the case of an authorized vehicle 1 whose secondary winding structure is correctly positioned and/or orientated with respect to the primary winding structure 3, the gate driver power supply is switched on. This is achieved by closing switching elements of relays (not shown) wherein each switching element can be controlled by a vehicle detection signal VDS_A, VDS_B and/or an inverted vehicle detection signal. It is possible that each evaluation unit 19a, 19b controls two relays in an anti-coincidence mode.

FIG. 8 shows an exemplary format of a datagram DG which e.g. comprises 28 bit. The datagram DG comprises a magic word MW which e.g. comprises 16 bit. Adjacent to the magic word MW, the datagram DG comprises flag data FL which e.g. comprises 4 bit. Adjacent to the flag data FL the datagram DG can comprise payload data PL which e.g. comprises 8 bit.

The magic word MW can provide or encode an identifier of a transmitter 7a, 7b (see FIG. 3) which transmits the signal providing the shown datagram DG. At a transmission rate of 4.5 kbit/s, a transmission duration of such a datagram DG is 6.22 ms.

FIG. 9 shows exemplary embodiments of magic words MW1, MW2. The first magic word MW1 can be used as an identifier of the first transmitter 7a (see FIG. 3). Correspondingly, the second magic word MW2 can be used as an identifier for the second transmitter 7b. Thus, the two different magic words MW1, MW2 are related to two different transmitters 7a, 7b. The magic words MW1, MW2 are used to synchronize on the boundaries of datagrams DG comprising shown magic words MW1, MW2 and to identify an authorized vehicle 1 (see FIG. 1).

The flag data FL (see FIG. 8) can be used as an address indicator for the payload data PL. In this case, the address indicator can be a counter value which represents the number of a datagram within a telegram.

It is shown, that the magic words MW1, MW2 comprise different bit sequences which allow an unambiguous identification of a transmitter 7a, 7b.

Figure 10:
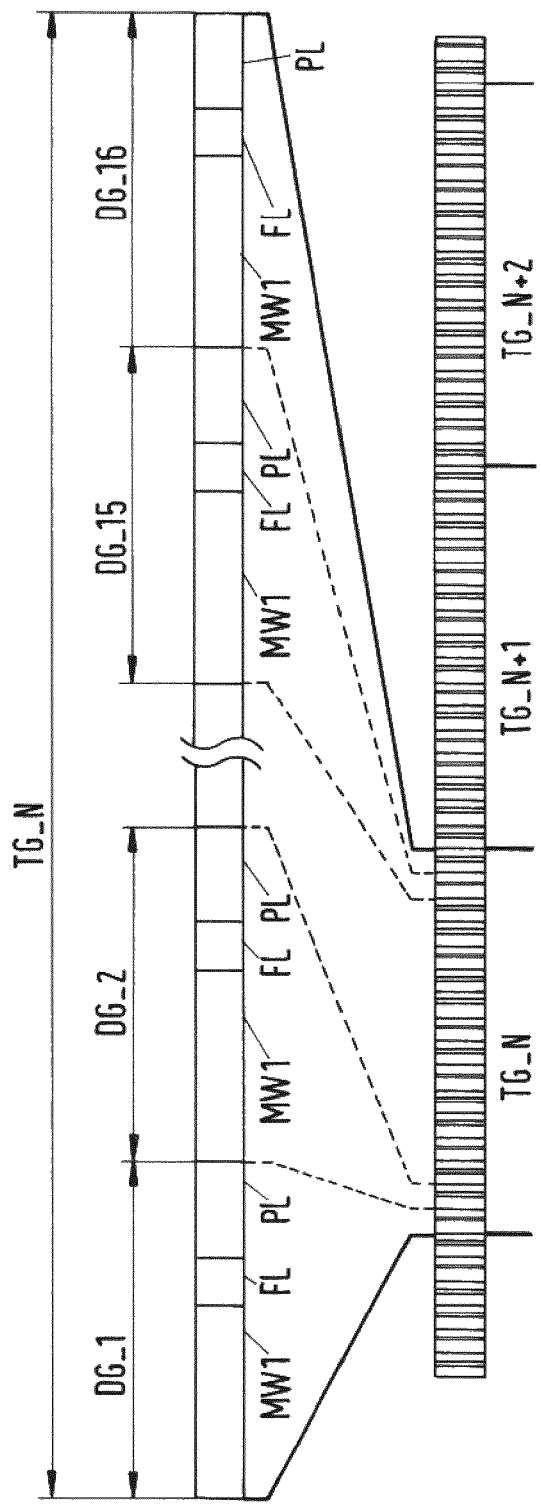

FIG. 10 shows a data stream which comprises multiple telegrams TG_N, TG_N+1, TG_N+2. Each telegram TG_N, TG_N+1, TG_N+2 comprises 16 datagrams DG_1, DG_2, ..., DG_15, DG_16 which are designed as shown in FIG. 8. Thus a telegram TG_N, TG_N+1, TG_N+2 can comprise 448 bit and encode 16 different frames of payload data PL. As a clock recovery in the receiver unit 17 (see FIG. 3) can synchronize on a bit change of the shown data stream, it is of advantage that the data stream has as many 0/1 changes as possible.

Furthermore, a datagram DG can advantageously be provided by an interleaved datagram DG, wherein subparts of the magic word MW, the flag data FL and the payload data PL can be distributed among the 28 bit of each datagram DG_1, DG_2, ..., DG_15, DG_16.

The transmission duration of the shown telegram TG_N amounts to 16×6.22 ms=99.555 ms at 405 kbit/s.

Figure 11:
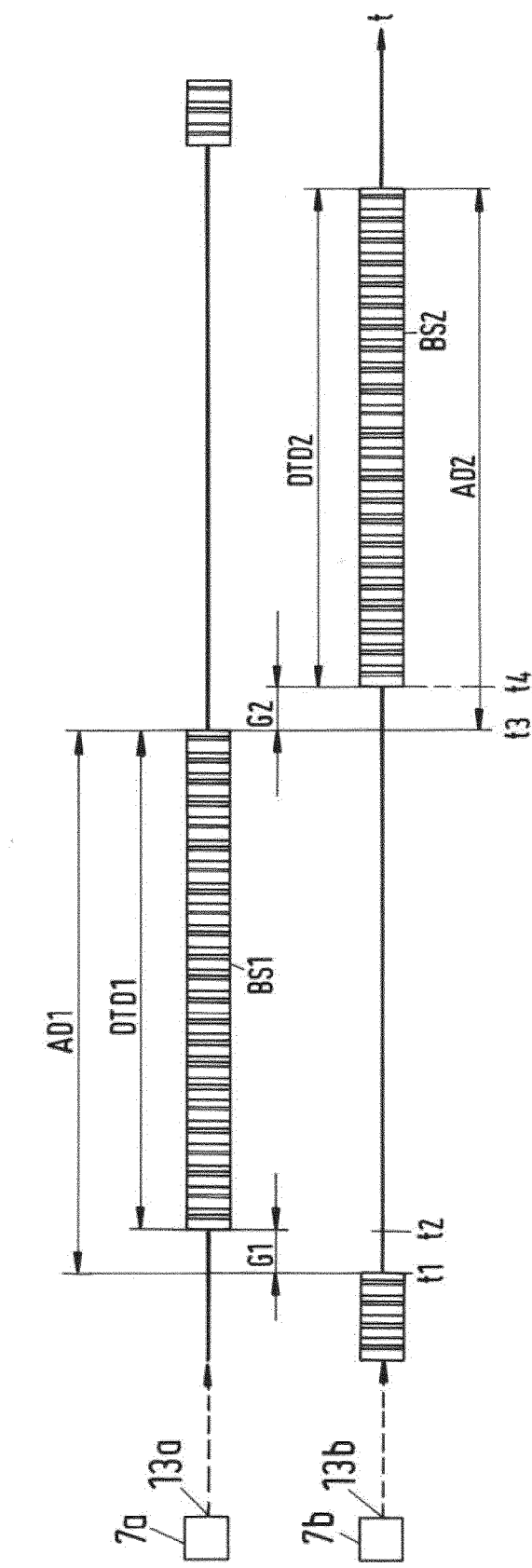

FIG. 11 shows a time course of the received bit stream while a switching between the two transmitters 7a, 7b (see FIG. 3) is performed. At a first time instant t1, a transmission time of the second transmitter 7b ends, wherein the second transmitter 7b is deactivated by the vehicle-sided control unit 11 (see FIG. 3). At the same time instant t1, the vehicle-sided control unit 11 activates the first transmitter 7a. Because of time delays during the activation and receiving process, the data stream encoded by the first signal 13a is received at a second time instant t2, wherein a first time gap G1 is arranged between the switching command at the first time instant t1 and the start of the data stream reception at the second time instant t2. At a third time instant, the first transmitter 7a is deactivated, wherein the second transmitter 7b is activated. Thus, an activation duration AD1 of the first transmitter 7a equals to the sum of the duration of the first time gap G1 and a data transmission duration DTD1 which equals to a transmission time interval assigned to the first transmitter 7a. Within the transmission time interval, in particular during data transmission duration DTD1, a bit sequence BS1 of the first transmitter 7a is received.

Correspondingly, a bit stream encoded by the second signal 13b is only received at a fourth time instant t4 after a second time gap G2 which is located between the third time instant t3 and the fourth time instant t4. An activation duration AD2 of the second transmitter 7b equals to the sum of the duration of the second time gap G2 and the data transmission duration DTD2 which equals to transmission time interval assigned to the second transmitter 7b. Within the transmission time interval, in particular during data transmission duration DTD2, a bit sequence BS2 of the second transmitter 7b is received.

A duration of the time gaps G1, G2 can e.g. be 10 ms+/−1 ms. A data transmission duration DTD1, DTD2 can e.g. be 200 ms. Thus, two telegrams TG_N, TG_N+1 (see FIG. 10) can be transmitted by each transmitter 7a, 7b within the corresponding activation duration AD1, AD2. Thus, the activation duration AD1, AD2 can equal to 200 ms+/−10 ms.

It is important that at the receiver side, the received signal is seen as a single bit stream. This bit stream is interrupted by the time gaps G1, G2 which result from the switchover from transmitter 7a, 7b to the other transmitter 7b, 7a. The time gaps G1, G2 divide the bit stream into bit stream sequences BS1, BS2 provided by the first or the second transmitter 7a, 7b. The time gaps G1, G2 are also visible within the analogue level-dependent signal aLDS_A, aLDS_B (see FIG. 3). A time course of the analogue level-dependent signal aLDS_A, aLDS_B corresponding to the time course of the bit stream provided by the received signal RS also comprises the first and the second time gaps G1, G2. Within these time gaps G1, G2 the level-dependent signals aLDS_A, aLDS_B reduce to a small value, e.g. zero.

A vehicle detection signal VDS_A, VDS_B can be generated by an evaluation unit 19a, 19b (see FIG. 3) in different steps. In a first step, a received signal RS_A is digitized. Then magic words MW1, MW2 (see e.g. FIG. 9) within the received bit stream (provided by the digitized received signal RS_A) are analyzed. Then, the first and the second evaluation unit 19a, 19b can evaluate one or more identifier-dependent criteria. A first criterion is e.g. fulfilled if the identifiers provided by the magic words MW1, MW2 correspond to predetermined authorized identifiers, e.g. of an authorized vehicle 1 (see FIG. 1). Only if all identifier-dependent criteria are fulfilled, an authorization-dependent activation signal is provided or takes a first value, which represents an authorized vehicle. Otherwise, the authorization-dependent activation signal is not provided or takes a value different from the first value which represents an unauthorized vehicle.

In a second step, the analogue level-dependent signal aLDS_A provided by the first carrier signal level detection unit 37a is digitized and a level-dependent activation signal is generated if predetermined time-related criteria of the (digitized) time course of the level-dependent signal are fulfilled. For example, the level-dependent activation signal can only be generated with a non-zero value if the level-dependent signal is higher than a predetermined threshold for a time duration which is at least equal to the data transmission duration DTD1 of the bit stream sequence BS1 assigned to the first transmitter 7a. This time duration can be provided by the difference between time instants of rising and falling edges of the level-dependent signal. Additionally, the level-dependent activation signal can only be generated if a time gap which follows the transmission of the bit stream sequence BS1 of the first transmitter 7a is at least equal to a predetermined duration of such a time gap. The time duration can also be provided by the difference between time instants of rising and falling edges of the level-dependent signal.

Only if certain level-dependent criteria are fulfilled, a first level-dependent activation signal is provided or takes a first value which represents that the transmitters 7a, 7b are positioned over the detection area 10 (see FIG. 2). The first level-dependent activation signal can be generated within a first channel of the wayside control unit 15. In an analogue way, a second level-dependent activation signal can provided or can take a first value, wherein the second level-dependent activation signal is generated in a second channel of the wayside control unit 15. The first evaluation unit 19a can generate the aforementioned vehicle detection signal VDS_A, in particular with a first value, only if the authorization dependent activation signal and the first level-dependent activation signals are provided or have a first value. Correspondingly, the second evaluation unit 19b can generate a vehicle detection signal VDS_B, in particular with a first value, only if the authorization dependent activation signal and the second level-dependent activation signal are provided or have a first value. Otherwise, no vehicle detection signal VDS_A, VDS_B is provided or said vehicle detection signal VDS_A, VDS_B takes a value different from the first value.

If a falling edge due to a time gap of a bit stream signal occurs, the synchronization on the received bit stream can be lost. To avoid disturbances due to such a time gap, time gaps between bit stream sequences can e.g. be handled in the following way. After predetermined time duration which is preferably shorter than the duration of the time gap, a timer unit can start to increment a timer variable. The incrementation of the timer variable is stopped if a bit stream signal is again received before a time out of the timer unit is reached. Although the synchronization is lost, a vehicle detection signal VDS_A, VDS_B can be still provided until the time out is reached. If a bit stream signal is detected before the time out, the vehicle detection signal VDS_A, VDS_B can continuously be provided by the evaluation units 19a, 19b. This control strategy using a timer can be applied to the generation of the aforementioned level-dependent signals and the generation of the authorization-dependent activation signal.

In FIG. 12, an exemplary relationship between a position of a first transmitter 7a relative to a detection area 10 of an antenna loop 4 and a corresponding analogue level-dependent signal aLDS_A, aLDS_B is shown. It is assumed that the first transmitter 7a is moved along a lateral axis LAA_C1, LAA_C2 of a vehicle-sided coordinate system C2 and a corresponding primary-sided coordinate system C1 (see FIG. 1 and FIG. 2). If, in a common plan of projection which is oriented orthogonal to a vertical axis VA_C1 of the primary-sided coordinate system C1 (see FIG. 1), the first transmitter 7a reaches a boundary or an envelope of the detection area 10, the analogue level-dependent signal aLDS_A, aLDS_B starts to increase. The more overlap between the detection area and the first transmitter 7a is provided in the common plane of projection, the higher the level of the analogue level-dependent signal aLDS_A, aLDS_B. A maximum value of said level is reached if the first transmitter 7a is located directly above a longitudinal centre line of the antenna loop 4. If the first transmitter 7a moves further along the lateral axis LAA_C1, the level of the analogue level-dependent signal aLDS_A, aLDS_B will start to decrease, wherein a minimum value is reached to the transmitter 7a has left the detection area 10 and no overlap occurs.

Further shown is a threshold value thr, wherein a position of the first transmitter 7a above detection area 10 of the antenna loop 4 is detected if the level of the level-dependent signal aLDS_A, aLDS_B is higher than the threshold value thr. Otherwise, it is detected that the transmitter 7a is not located above detection area 10.

Figure 13A:
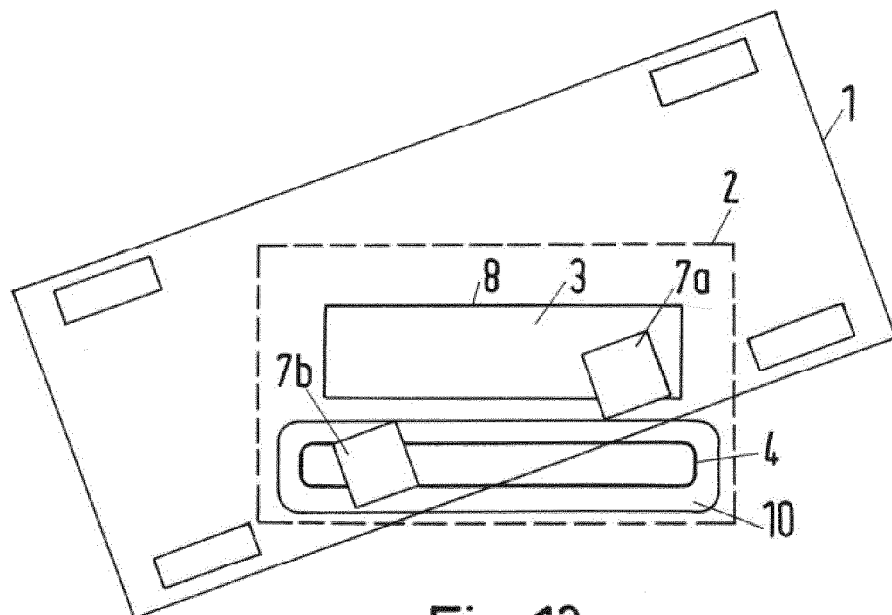

In FIG. 13a a vehicle 1 with an incorrect position and/or orientation relative to a primary unit 2 is shown. It can be seen that the first transmitter 7a (see FIG. 1) is not located above detection area 10 of the antenna loop 4. Thus only the second signal 13b (see e.g. FIG. 3) transmitted by the second transmitter 7b can be received by the antenna loop 4. This results in a missing bit stream sequence BS1 transmitted by a first transmitter 7a on a receiver side. Subsequently, evaluation units 19a, 19b (see FIG. 3) will not generate an authorization-dependent activation signal with a first value and no level-dependent activation signals with a first value which, in turn, will result in a vehicle detection signal VDS_A, VDS_B with a value different from a first value which represents an authorized vehicle 1 in a correct position and/or orientation.

Figure 13B:
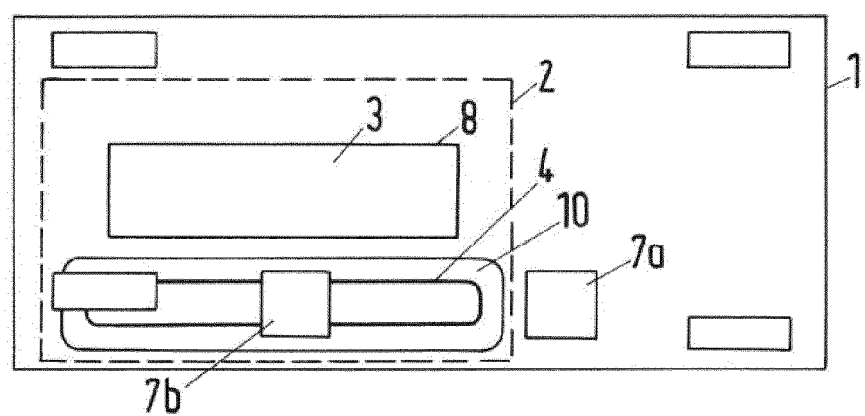

FIG. 13b shows a vehicle 1 in another incorrect position and/or orientation. As in FIG. 13a, a first signal 13a (see FIG. 3) transmitted by the first transmitter 7a will not be received by the antenna loop 4 as the first transmitter 7a is not located of the detection area 10 of the antenna loop 4. Thus the same results occur as described reference to FIG. 26a.

Figure 14:
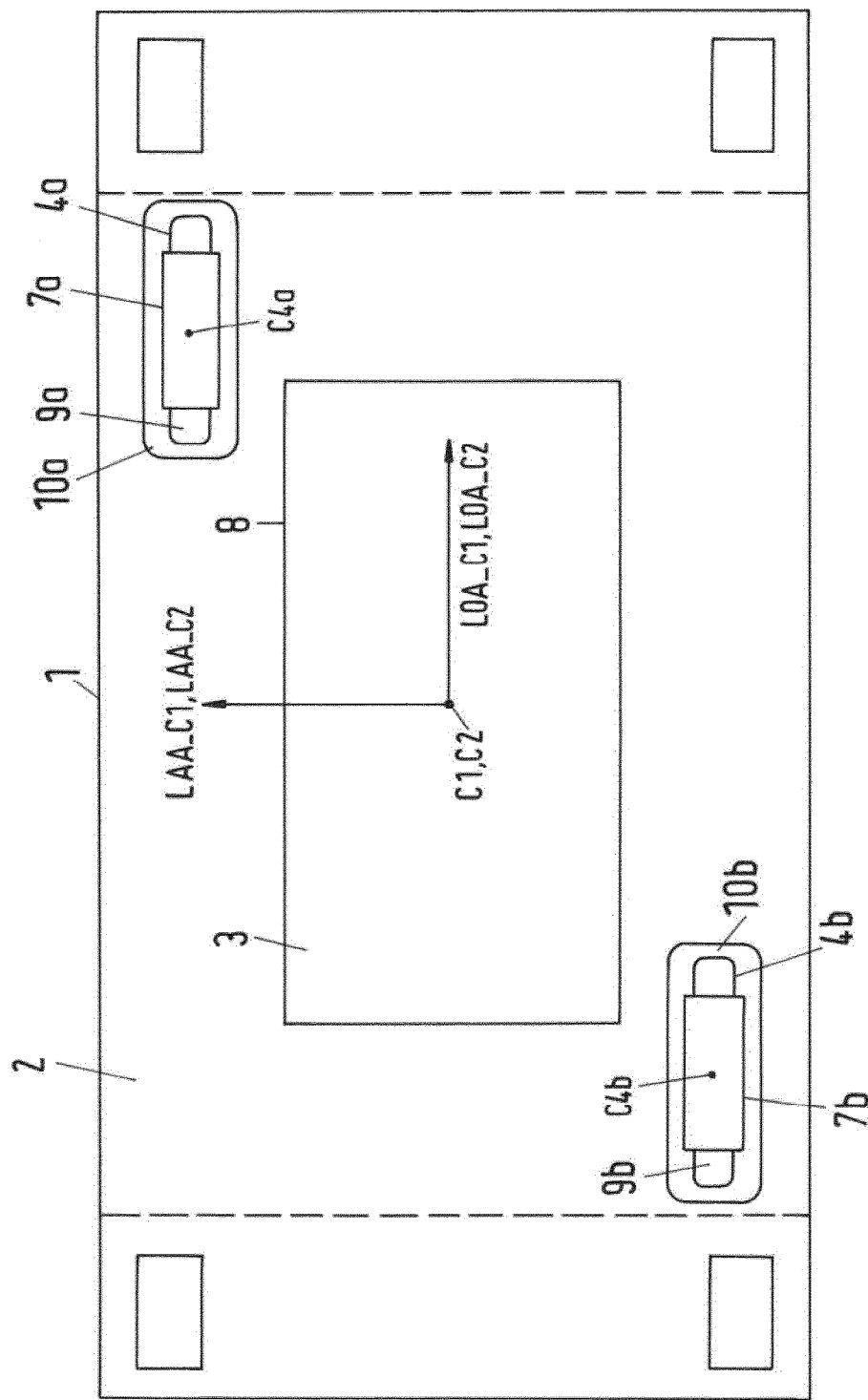

FIG. 14 shows a schematic top view on the vehicle 1 and the primary unit 2 according to another embodiment. It is shown the vehicle-sided coordinate system C2 and the primary-sided coordinate system C1 cover each other in a common plane of projection which is oriented perpendicular to the vertical axes VA_C1, VA_C2. Also shown is a primary winding structure 3 and an envelope 8 of the primary winding structure 3.

In contrast to the embodiment shown in FIG. 2, a wayside control unit of a system for inductive power transfer to a vehicle 1 (see FIG. 1) comprises more than one receiving means, namely a first primary-sided antenna loop 4a and a second primary-sided antenna loop 4b. Also shown are the vehicle-sided first transmitter 7a and second transmitter 7b. It is shown that the first transmitter 7a is arranged at least partially over a first detection area 10a, in particular over an inner surface 9a enclosed by the first antenna loop 4a. Correspondingly, the second transmitter 7b is arranged at least partially over a second detection area 10b, in particular over an inner surface 9b enclosed by the second antenna loop 4b.

The first detection area 10a is assigned to the first antenna loop 4a, wherein only signals 13a (see FIG. 3) emitted by the first transmitter 7a can be received by the first antenna loop 4a if the respective transmitter 7a is arranged at least partially, preferably fully, over the detection area 10a and with a with a vertical distance smaller than predetermined maximal distance. The second detection area 10b is assigned to the second antenna loop 4b, wherein only signals 13b (see FIG. 3) emitted by the second transmitter 7b can be received by the second antenna loop 4b if the respective transmitter 7b is arranged at least partially, preferably fully, over the detection area 10b and with a with a vertical distance smaller than predetermined maximal distance.

It is shown that the first detection area 10a of the first antenna loop 4a is arranged beside the envelope 8 of the primary winding structure 3. A geometric center C4a of the first antenna loop 4a is arranged with a predetermined lateral distance and with a predetermined longitudinal distance from the geometric center of the primary-sided coordinate system C1. In particular, the first detection area 10a is arranged in a first quadrant of the primary-sided coordinate system, i.e. on the left front section of the primary-sided coordinate system. A geometric center C4b of the second antenna loop 4b is arranged with a predetermined lateral distance and with a predetermined longitudinal distance from the geometric center of the primary-sided coordinate system C1. However, the second detection area 10b is arranged in a third quadrant of the primary-sided coordinate system, i.e. on the right back section of the primary-sided coordinate system.

If the vehicle is not correctly positioned over the primary unit 2, at least one of the transmitters 7a, 7b can be arranged outside the corresponding detection areas 10a, 10b in a common plane of projection which can be oriented perpendicular to the aforementioned vertical axes VA_C1, VA_C2. In this case, at least one of the group of the first and the second signal 13a, 13b cannot be received by the respective antenna loop 4a, 4b. In this case, an incorrect position and/or orientation of primary winding structure 3 relative to the secondary winding structure (not shown) can be detected. In turn, only in the case where both, the first and the second transmitter 7a, 7b, are located over the respective detection area 10a, 10b and their signals 13a, 13b are received by the respective antenna loops 4a, 4b, a correct position and/or orientation of the primary winding structure 3 and the secondary winding structure (not shown) can be detected.

The invention claimed is:

1. A method of detecting a correct position and/or orientation of a secondary winding structure of a secondary unit relative to a primary winding structure of a primary unit of a system for inductive power transfer to a vehicle, the method comprising:
providing a primary unit of a system for inductive power transfer;
providing a wayside control unit comprising at least one receiving means;
providing a vehicle comprising a secondary unit of the system for inductive power transfer, at least a first transmitter and a second transmitter;
generating, by the primary unit, an alternating electromagnetic field, wherein the wayside control unit controls the generation of the alternating electromagnetic field by the primary unit;
receiving, by the secondary unit, the alternating electromagnetic field;
transmitting, by the at least a first transmitter, a first signal;
transmitting, by the second transmitter, a second signal;
receiving, by the at least one receiving means of the wayside control unit, the first and the second signal;
detecting, depending on the first and second signal, the correct position and/or orientation of the secondary winding structure of the secondary unit relative to the primary winding structure of the primary unit;
determining, depending on the carrier signal level of the first and second signals, a correct position and/or orientation of the secondary winding structure of the secondary unit relative to the primary winding structure of the primary unit; and
determining a signal level of the first and second signals.

2. The method according to claim 1, the method further comprising transmitting power of the first and the second signal which is constant.

3. The method according to claim 1, wherein the at least one receiving means consists of only one receiving means.

4. The method according to claim 1, further comprising transmitting the first signal and the second signal in an alternating sequence.

5. The method according to claim 1, further comprising terminating, at a switching point, the one of the first and the second signal which has been received last and receiving, after the switching point, the remaining one of the first and the second signal only after a time gap with a predetermined duration.

6. The method according to claim 1, further comprising detecting, in response to a time course of the carrier signal level of the first and second signals matching an expected time course for a time duration which is equal to or is greater than a transmission time interval assigned to the first transmitter or a transmission time interval assigned to the second transmitter, a correct position and/or orientation of the secondary winding structure relative to the primary winding structure.

7. The method according to claim 1, the method further comprising detecting, immediately or after a predetermined timeout interval and in response to the time course of the carrier signal level of the first and second signals not matching an expected time course, an incorrect position and/or orientation of the secondary winding structure relative to the primary winding structure.

8. The method according to claim 1, the method further comprising transmitting, by the first signal and/or the second signal, authentication-related data from the vehicle to the wayside control unit, and determining, based on the authentication-related data, an authorization for power transfer to the vehicle.

9. The method according to claim 8, the method further comprising transmitting by the first signal, an identifier of the first transmitter and/or transmitting, by the second signal, an identifier of the second transmitter.

10. The method according to claim 9, the method further comprising approving the authorization for power transfer in response to detecting an expected number of correct identifiers of the first transmitter within a time duration which is equal to or is greater than the transmission time interval assigned to the first transmitter and detecting an expected number of correct identifiers of the second transmitter within a time duration which is equal to or is greater than the transmission time interval assigned to the second transmitter.

11. The method according to claim 9, the method further comprising disapproving, immediately or after a predetermined timeout interval, the authorization for power transfer in response to a number of correct identifiers different from an expected number of correct identifiers of the first transmitter or in response to detecting the second transmitter within an expected time duration.

12. The method according to claim 1, the method further comprising performing an analysis of the first and second signals on two channels.

13. The method according to claim 1, the method further comprising enabling an inductive power transfer only in response to detecting a correct position and/or orientation of the secondary winding structure relative to the primary winding structure and approving an authorization for power transfer of the vehicle.

14. A vehicle comprising a secondary unit of a system for inductive power transfer for receiving an alternating electromagnetic field, wherein the vehicle comprises at least a first transmitter for transmitting a first signal and a second transmitter for transmitting a second signal,
wherein a wayside control unit controls generation of the alternating electromagnetic field by a primary unit of the system for inductive power transfer,
wherein the at least first and second transmitter are designed and/or arranged with respect to a secondary winding structure of the secondary unit and with respect to at least one receiving means of the wayside control unit such that a correct or an incorrect position and/or orientation of the secondary winding structure relative to a primary winding structure of the primary unit is unambiguously determinable depending at least on the first and the second signal, wherein a signal level of the first and second signals is determinable, wherein a correct position and/or orientation of the secondary winding structure of the secondary unit relative to the primary winding structure of a primary unit is determinable depending on the carrier signal level of the first and second signals.

15. A wayside control unit of a system for inductive power transfer to a vehicle,
wherein the wayside control unit controls generation of an alternating electromagnetic field by a primary unit of the system for inductive power transfer,
wherein the wayside control unit comprises at least one receiving means for receiving at least a first and a second signal, wherein the first signal is transmitted by a first transmitter of the vehicle and the second signal is transmitted by a second transmitter of the vehicle,
wherein the at least one receiving means is designed and/or arranged with respect to a primary winding structure of the primary unit and with respect to the at least first and second transmitter such that a correct or an incorrect position and/or orientation of a secondary winding structure relative to the primary winding structure is unambiguously determinable depending at least on the first and the second signal, wherein a signal level of the first and second signals is determinable, wherein a correct position and/or orientation of the secondary winding structure of a secondary unit relative to the primary winding structure of the primary unit is determinable depending on the carrier signal level of the first and second signals.

16. The wayside control unit according to claim 15, wherein the control unit comprises at least one means for generating an analogue level-dependent signal, wherein the level-dependent signal represents the carrier signal level of the first and second signals.

17. The wayside control unit according to claim 15, wherein the control unit comprises at least one A/D converter for generating a digital signal from the first and second signals and/or the analogue level-dependent signal.

18. The wayside control unit according to claim 15, wherein the control unit comprises at least one evaluation unit for detecting a correct or incorrect position and/or orientation of the secondary winding structure relative to the primary winding structure based on the first and second signals and/or for determining an authorization for power transfer to the vehicle based on the first and second signals.

19. The wayside control unit according to claim 15, wherein the control unit comprises at least one switching means for switching a power supply of a driving unit for controlling switching elements of a wayside power converter by which the primary winding structure is operated.

20. The wayside control unit according to claim 15, wherein the control unit is designed at least partially as a two-channel control unit, wherein an analysis of the first and second signals is performable on two channels.

* * * * *